(12) United States Patent
Takagi et al.

(10) Patent No.: US 7,522,546 B2
(45) Date of Patent: Apr. 21, 2009

(54) BROADCAST RECEIVER DEVICE, BROADCAST RECEIVING SET, AND CHANNEL SWITCHING METHOD

(75) Inventors: Toshihiro Takagi, Daito (JP); Yasuhiro Inui, Daito (JP)

(73) Assignee: Funai Electric Co., Ltd., Daito-Shi, Osaka (JP)

( * ) Notice: Subject to any disclaimer, the term of this patent is extended or adjusted under 35 U.S.C. 154(b) by 553 days.

(21) Appl. No.: 11/403,268

(22) Filed: Apr. 13, 2006

(65) Prior Publication Data

US 2006/0236356 A1 Oct. 19, 2006

(30) Foreign Application Priority Data

Apr. 13, 2005 (JP) ............... 2005-115718

(51) Int. Cl.
G08C 17/00 (2006.01)
H04H 20/71 (2008.01)
H04B 7/185 (2006.01)

(52) U.S. Cl. .................. 370/311; 370/318; 455/13.4

(58) Field of Classification Search ............ 455/13.4, 455/522, 24, 574, 127.1, 343.2, 158.2, 127.4; 370/311, 312, 318
See application file for complete search history.

(56) References Cited

U.S. PATENT DOCUMENTS

| | | | | | |
|---|---|---|---|---|---|
| 6,766,526 | B1 * | 7/2004 | Ellis | ................ | 725/57 |
| 7,050,117 | B2 * | 5/2006 | Takagi et al. | ................ | 348/725 |
| 2002/0089603 | A1 * | 7/2002 | Onomatsu | ................ | 348/554 |
| 2002/0101540 | A1 * | 8/2002 | Takagi et al. | ................ | 348/553 |

FOREIGN PATENT DOCUMENTS

| | | |
|---|---|---|
| JP | 4-324773 | 11/1992 |
| JP | 2000-299826 | 10/2000 |
| JP | 2002-352570 | 12/2002 |
| JP | 2003-110963 | 4/2003 |

OTHER PUBLICATIONS

Patent Abstracts of Japan, Publication No. 04-324773, Publication Date: Nov. 13, 1992, 1 page.
Patent Abstracts of Japan, Publication No. 2000-299826, Publication Date: Oct. 24, 2000, 1 page.
Patent Abstracts of Japan, Publication No. 2002-352570, Publication Date: Dec. 6, 2002, 1 page.
Patent Abstracts of Japan, Publication No. 2003-110963, Publication Date: Apr. 11, 2003, 1 page.

* cited by examiner

*Primary Examiner*—Melody Mehrpour
(74) *Attorney, Agent, or Firm*—Osha • Liang LLP

(57) ABSTRACT

When a digital broadcast is currently extracted and a switching direction instruction is accepted, determination is made as to which of a CH number (analog number) next to a currently extracted channel in the switching direction according to the order indicated in an analog CH map and a CH number (digital number) next to the currently extracted channel in the switching direction according to the order indicated in a digital channel map is closer to the number of the currently extracted channel (extracted number). When closer to the analog number, the channel is switched to the analog number. When closer to the digital number, the channel is switched to the digital number. Thus, the channel of analog and digital broadcasts can be switched in a seamless manner.

7 Claims, 12 Drawing Sheets

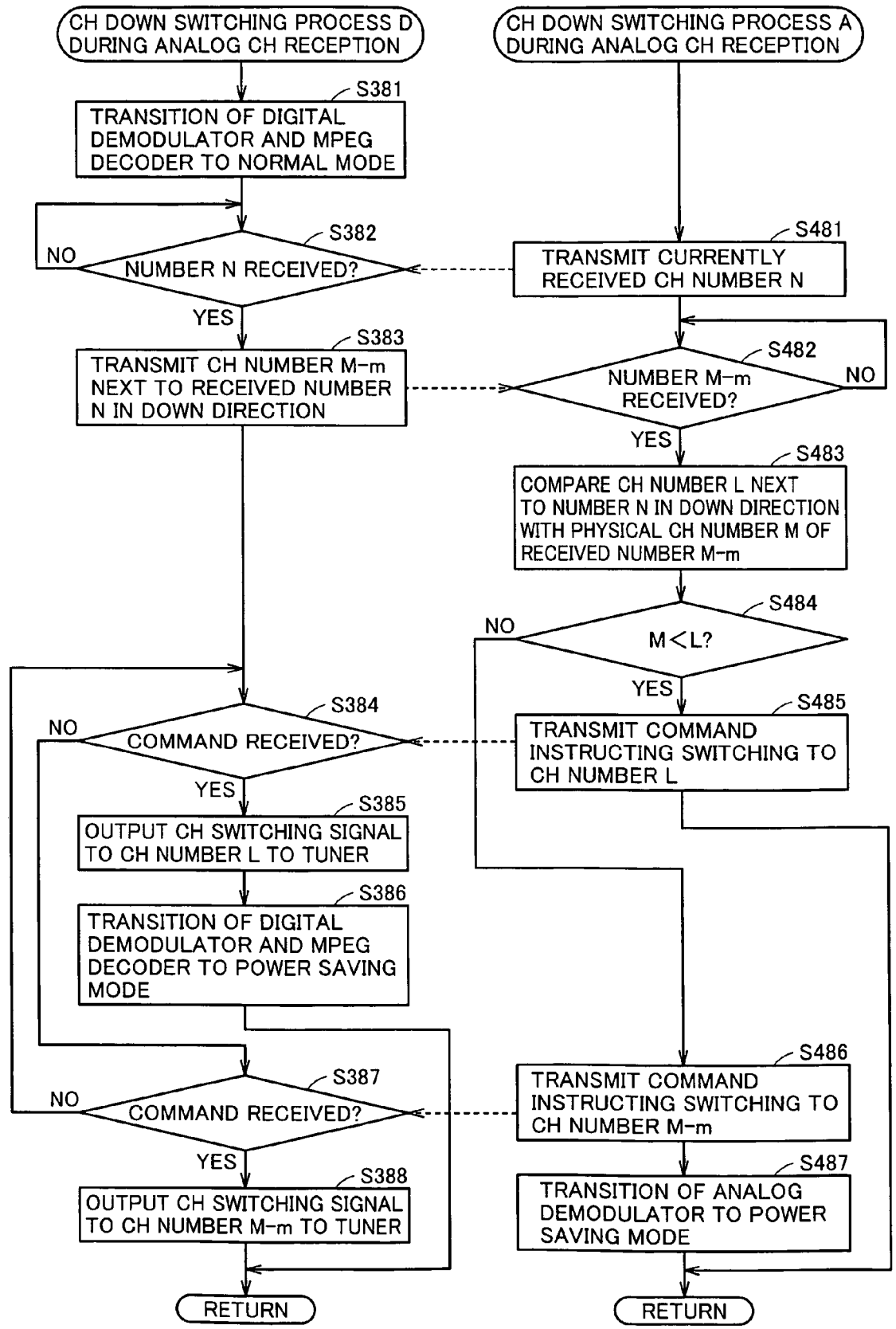

BROADCAST RECEIVER DEVICE, BROADCAST RECEIVING SET, AND CHANNEL SWITCHING METHOD

BACKGROUND OF THE INVENTION

1. Field of the Invention

The present invention relates to a broadcast receiver device, a broadcast receiving set, and a channel switching method. Particularly, the present invention relates to a broadcast receiver device, a broadcast receiving set, and a channel switching method, suitable for receiving analog broadcasts and digital broadcasts.

2. Description of the Background Art

Conventionally, STBs (Set Top Box) and televisions that can receive both analog broadcasts and digital broadcasts are configured to switch the channel upon switching to the mode of receiving analog broadcasts or digital broadcasts.

For example, in the case where the channel is to be switched from an analog broadcast channel of channel number 9 to a digital broadcast channel of channel number 10-1, the reception mode is switched to receiving digital broadcasts, and then the channel number is switched to 10-1.

None of such STBs and televisions that receive analog broadcasts or digital broadcasts upon switching between an analog reception block and a digital reception block were configured to suppress power supply to the block not being used, i.e. suppress power supply to one of the analog reception block and digital reception block.

Japanese Patent Laying-Open No. 04-324773 (hereinafter, referred to as Patent Document 1) discloses a recording and reproduction apparatus having a plurality of blocks divided into groups that will be operated simultaneously to control power supply on a group-by-group basis (for example, refer to Paragraphs 0020 and 0023 in Patent Document 1).

Japanese Patent Laying-Open No. 2000-299826 (hereinafter, referred to as Patent Document 2) discloses a television tuner including a tuner main unit and a band decoder supplying a band switching voltage and power supply voltage to the tuner main unit, wherein power supply to the tuner main unit is suppressed when the tuner is not in operation (for example, refer to Paragraph 0026 in Patent Document 2).

Japanese Patent Laying-Open No. 2002-352570 (hereinafter, referred to as Patent Document 3) discloses a speech reproduction apparatus turning off the power of the tuner block when the tuner function is not selected through a key switch or a remote controller (for example, refer to Paragraph 0027 in Patent Document 3).

Japanese Patent Laying-Open No. 2003-110963 (hereinafter, referred to as Patent Document 4) discloses a terrestrial digital broadcast receiver including a front end configured to output a flag indicating whether reception is allowed or not, select a channel, demodulate a digital demodulation signal, and the like, as well as a back end configured to reproduce video or audio. When the reception condition is poor and the front end is not completely error free, the power supply path to all the blocks other than the front end is cut (for example, refer to Paragraphs 0028 and 0033 in Patent Document 4).

Conventional STBs and televisions that can receive both analog broadcasts and digital broadcasts are disadvantageous in that switching between an analog channel and a digital channel cannot be conducted in a seamless manner. In other words, switching to a mode of receiving digital broadcasts or the mode of receiving analog broadcasts must be first effected before channel switching, as mentioned above.

There were no STBs and televisions that had the power supply to the analog reception block or digital reception block that is not currently used suppressed.

SUMMARY OF THE INVENTION

In view of the foregoing, an object of the present invention is to provide a broadcast receiver device, a broadcast receiving set, and a channel switching method to allow switching between the channels of analog broadcasts and digital broadcasts in a seamless manner.

Another object of the present invention is to provide a broadcast receiver device, a broadcast receiving set, and a channel switching method that can save power at either the portion that converts signals of analog broadcasts or the portion that converts signals of digital broadcasts, whichever is not currently being used.

According to an aspect of the present invention, a broadcast receiver device includes a broadcast signal extraction unit, a digital signal conversion unit, an analog signal conversion unit, a digital control unit, and an analog control unit. The broadcast signal extraction unit switches a channel and extracts a broadcast signal corresponding to the switched channel, from externally applied broadcast signals corresponding to respective plurality of channels. The digital signal conversion unit converts a digital broadcast signal extracted by the broadcast signal extraction unit into an output signal to output the converted output signal. The analog signal conversion unit converts an analog broadcast signal extracted by the broadcast signal extraction unit into an output signal to output the converted output signal. The digital control unit controls the digital signal conversion unit. The analog control unit controls the analog signal conversion unit.

The broadcast receiver device further includes a switching instruction acceptance unit. The digital control unit of the broadcast receiver device includes a digital storage unit, a digital determination unit, a digital extraction mode digital switching control unit, and an analog extraction mode digital switching control unit. The analog control unit of the broadcast receiver device includes an analog storage unit, an analog determination unit, a digital extraction mode analog switching control unit, and an analog extraction mode analog switching control unit.

The digital storage unit prestores a digital channel map in which each channel of a digital broadcast is arranged in order of a preassigned number. The analog storage unit prestores an analog channel map in which each channel of an analog broadcast is arranged in order of a preassigned number. The switching instruction acceptance unit accepts instruction of a channel switching direction.

The digital determination unit determines which of an analog number that is the number of the channel next to the currently extracted channel in the switching direction according to the order indicated in the analog channel map stored in the analog storage unit and a digital number that is the number of the channel next to the currently extracted channel in the switching direction according to the order indicated in the digital channel map stored in the digital storage unit is closer to the currently extracted number that is the number of the currently extracted channel in the case where a digital broadcast signal is currently extracted by the broadcast signal extraction unit when an instruction of the switching direction is accepted by the switching instruction acceptance unit.

The digital extraction mode analog switching control unit controls the broadcast signal extraction unit to switch to the channel of the analog number when determination is made of being closer to the analog number by the digital determination unit. The digital extraction mode digital switching control unit controls the broadcast signal extraction unit to switch to the channel of the digital number when determination is made of being closer to the digital number by the digital determination unit.

The analog determination unit determines which of the digital number and analog number is closer to the currently extracted number in the case where an analog broadcast signal is currently extracted by the broadcast signal extraction unit when an instruction of the switching direction is accepted by the switching acceptance unit.

The analog extraction mode digital switching control unit controls the broadcast signal extraction unit to switch to the channel of the digital number when determination is made of being closer to the digital number by the analog determination unit. The analog extraction mode analog switching control unit controls the broadcast signal extraction unit to switch to the channel of the analog number when determination is made of being closer to the analog number by the analog determination unit.

Preferably, the digital determination unit includes an analog inquiry unit inquiring of the analog control unit about the analog number. The analog determination unit includes a digital inquiry unit inquiring of the digital control unit about the digital number. The analog control unit includes an analog transmission unit transmitting the analog number inquired by the analog inquiry unit to the digital control unit. The digital control unit includes a digital transmission unit transmitting the digital number inquired by the digital inquiry unit to the analog control unit.

The digital determination unit determines which of the analog number transmitted by the analog transmission unit and the digital number is closer to the currently extracted number. The analog determination unit determines which of the digital number transmitted by the digital transmission unit and the analog number is closer to the currently extracted number.

Further preferably, the broadcast receiver device further includes a digital extraction mode digital power saving unit, a digital extraction mode analog power saving unit, an analog extraction mode analog power saving unit, and an analog extraction mode digital power saving unit.

The digital extraction mode digital power saving unit causes transition of the digital signal conversion unit to a power saving state when switched to a channel of an analog number by the digital extraction mode analog switching control unit. The digital extraction mode analog power saving unit causes transition of the analog signal conversion unit to a power saving state when switched to a channel of a digital number by the digital extraction mode digital switching control unit.

The analog extraction mode analog power saving unit causes transition of the analog signal conversion unit to a power saving state when switched to a channel of a digital number by the analog extraction mode digital switching control unit. The analog extraction mode digital power saving unit causes transition of the digital signal conversion unit to a power saving state when switched to a channel of an analog number by the analog extraction mode analog switching control unit.

According to another aspect of the present invention, a broadcast receiving set includes a broadcast receiver device, and an output device to output information indicated by an output signal output from the digital signal conversion unit or analog signal conversion unit.

Preferably, in the broadcast receiver device or broadcast receiving set, the broadcast signal extraction unit is a tuner, the digital signal conversion unit is a digital broadcast reception block, and the analog signal conversion unit is an analog broadcast reception block.

According to a further aspect of the present invention, a channel switching method switches the channel by the broadcast receiver device set forth above.

The channel switching method includes the step of accepting an instruction of a channel switching direction. The channel switching method also includes the step of the digital control unit determining which of an analog number that is the number of the channel next to the currently extracted channel in the switching direction according to the order indicated in the analog channel map and a digital number that is the number of the channel next to the currently extracted channel in the switching direction according to the order indicated in the digital channel map is closer to the currently extracted number that is the number of the currently extracted channel in the case where a digital broadcast signal is currently extracted by the broadcast signal extraction unit when an instruction of the switching direction is accepted.

The channel switching method further includes the step of the analog control unit controlling the broadcast signal extraction unit to switch to the channel of the analog number when determination is made of being closer to the analog number, and the step of the digital control unit controlling the broadcast signal extraction unit to switch to the channel of a digital number when determination is made of being closer to the digital number.

The channel switching method further includes the step of the analog control unit determining which of the digital number and analog number is closer to the currently extracted number in the case where an analog broadcast signal is currently extracted by the broadcast signal extraction unit when an instruction of the switching direction is accepted, the step of the digital control unit controlling the broadcast signal extraction unit to switch to the channel of the digital number when determination is made of being closer to the digital number, and the step of the analog control unit controlling the broadcast signal extraction unit to switch to the channel of the analog number when determination is made of being closer to the analog number.

In accordance with the present invention, an instruction of a channel switching direction is accepted by the broadcast receiver device. In the case where a digital broadcast signal is currently extracted by the broadcast signal extraction unit when an instruction of the switching direction is accepted, determination is made as to which of an analog number that is the number of the channel next to the currently extracted channel in the switching direction according to the order indicated in the analog channel map and a digital number that is the number of the channel next to the currently extracted channel in the switching direction according to the order indicated in the digital channel map is closer to the currently extracted number that is the number of the currently extracted channel. When determination is made of being closer to the analog number, switching is effected to the channel of the analog number. When determination is made of being closer to a digital number, switching is effected to the channel of the digital number.

In the case where an analog broadcast signal is currently extracted when an instruction of the switching direction is accepted, determination is made as to which of a digital number and an analog number is closer to the currently extracted number. When determination is made of being closer to the digital number, switching is effected to the channel of the digital number. When determination is made of being closer to the analog number, switching is effected to a channel of an analog number.

By the broadcast receiver device of the present invention, switching is effected to a channel of a digital broadcast or analog broadcast whose number is closer to the number of the currently extracted channel, regardless of which of a digital broadcast signal or an analog broadcast signal is currently being extracted. Thus, a broadcast receiver device that can switch the channel between an analog broadcast and a digital broadcast in a seamless manner can be provided.

In a digital broadcast signal extraction mode at the broadcast receiver device of the present invention, the digital signal conversion unit is set to a power saving state when switched to a channel of an analog number whereas the analog signal conversion unit is set to a power saving state when switched to a channel of a digital number. In an analog broadcast signal extraction mode at the broadcast receiver device of the present invention, the analog signal conversion unit is set to a power saving state when switched to a channel of a digital number whereas the digital signal conversion unit is set to a power saving state when switched to a channel of an analog number.

By virtue of the broadcast receiver device of the present invention, transition of either the analog signal conversion unit or digital signal conversion unit, whichever is not used, to a power saving state is effected. Thus, a broadcast receiver device that can save power at the portion converting an analog broadcast signal or the portion converting a digital broadcast signal, whichever is not used, can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a flow chart of a channel down switching process during reception of an analog channel (hereinafter, referred to as "Adown process") according to the second embodiment of the present invention.

DESCRIPTION OF THE PREFERRED EMBODIMENTS

Figure 1:
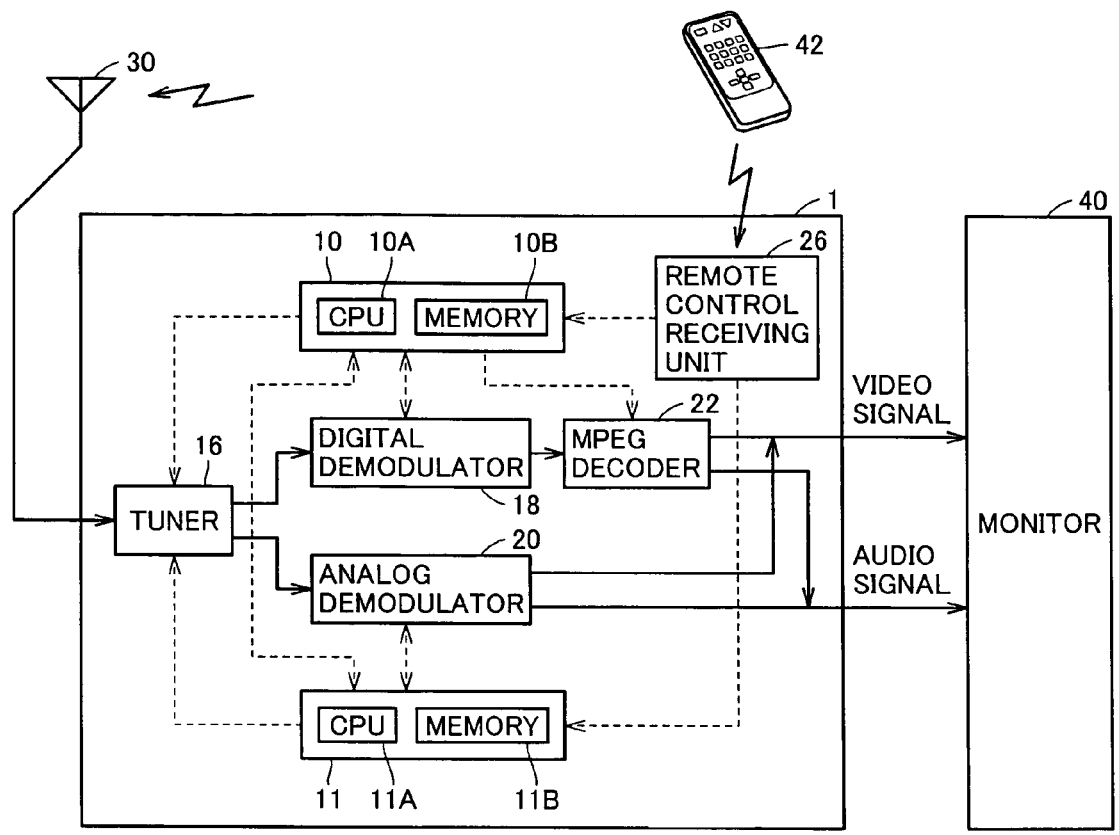
FIG. 1 is a schematic diagram of a configuration of a broadcast receiver device according to a first embodiment of the present invention.

Embodiments of the present invention will be described hereinafter with reference to the drawings.

In the drawings, the same or corresponding elements have the same reference characters allotted, and description thereof is not repeated.

First Embodiment

Referring to FIG. 1, a broadcast receiver device 1 according to a first embodiment of the present invention receives a broadcast signal from an antenna 30, and outputs a video signal and an audio signal towards a monitor 40. Broadcast receiver device 1 receives an instruction signal from a remote controller 42.

Since antenna 30, monitor 40, and remote controller 42 are well-known in the field of art, detailed description thereof will not be provided here.

Broadcast receiver device 1 includes a digital control unit 10, an analog control unit 11, a tuner 16, a digital demodulator 18, an analog demodulator 20, an MPEG (Moving Picture Experts Group) decoder 22, and a remote control receiving unit 26.

Digital control unit 10 includes a CPU (Central Processing Unit) 10A executing a program for controlling processes associated with digital broadcast signal reception, and a memory 10B storing a program to be executed, data during program execution, and data corresponding to the result of program execution.

Analog control unit 11 includes a CPU 11B executing a program for controlling processes associated with analog broadcast signal reception, and a memory 11B storing a program to be executed, data during program execution, and data corresponding to the result of program execution.

Tuner 16 extracts a broadcast signal corresponding to the channel selected in response to an instruction from digital control unit 10 or analog control unit 11, among the received broadcast signals. When the extracted broadcast signal is a digital broadcast signal, tuner 16 outputs the digital broadcast signal to digital demodulator 18. When the extracted broadcast signal is an analog broadcast signal, tuner 16 outputs the extracted analog broadcast signal to analog demodulator 20.

Digital demodulator 18 receives a digital broadcast signal from tuner 16 to demodulate the digital broadcast signal into an MPEG-2TS (Moving Picture Experts Group phase 2 Transport Stream) signal corresponding to a digital-encoded version of video and audio to output the MPEG-2TS signal to MPEG decoder 22.

The digital television broadcast signal is transmitted, encoded with Reed-Solomon code and convolution code. Therefore, digital demodulator 18 can conduct error correction in the aforementioned decode process. In the error correction process, digital demodulator 18 calculates the reception data error rate of the received broadcast signal, and provides the reception data error rate to digital control unit 10. Since digital demodulator 18 conducts error correction for every predetermined number of data included in the received broadcast signal, the reception data error rate can be calculated within one frame (1/30 seconds) from the start of reception. Digital control unit 10 can determine the signal level of the broadcast signal based on the reception data error rate.

Digital television broadcasts include the ISDB-T (Integrated Services Digital Broadcasting for Terrestrial) system employed in Japan, the ATSC (Advanced Television Systems Committee) system employed in the United States, and the DVB-T (Digital Video Broadcasting for Terrestrial) employed in Europe. Since all these systems have broadcast signals encoded and transmitted, error correction is allowed, and the reception data error rate can be calculated during the process thereof. Therefore, digital demodulator 18 of the first embodiment may employ any of the systems set forth above.

Analog demodulator 20 receives an analog broadcast signal from tuner 16 to demodulate the signal into a video signal and an audio signal. Analog demodulator 20 outputs the demodulated audio signal to an external source (here, monitor 40). Analog demodulator 20 informs digital control unit 10 whether a horizontal synchronizing signal has been captured or not.

Analog television broadcast signals include a horizontal synchronizing signal and a vertical synchronizing signal for the purpose of controlling horizontal scanning and vertical scanning of the scanning lines. These horizontal synchronizing signals and vertical synchronizing signals must be captured for analog demodulator 20 to demodulate a video signal.

A horizontal synchronizing signal has a frequency sufficiently higher than that of a vertical synchronizing signal. Therefore, a horizontal synchronizing signal is more susceptible to noise, as compared to a vertical synchronizing signal. In other words, determination can be made of the reception state based on whether a horizontal synchronizing signal has been captured or not.

Analog demodulator 20 includes an AGC (Auto Gain Control) circuit. An AGC circuit functions to maintain the broadcast signal from tuner 16 at a constant level under feedback control in order to alleviate variation in the contrast of the picture caused by the strong/weak broadcast signals of analog television broadcasts.

When the voltage level of the broadcast signal output from the AGC circuit is low, a horizontal synchronizing signal cannot be captured. Therefore, the broadcast signal is amplified by the AGC circuit. Digital control unit 10 can determine the level of the broadcast signal based on the amplification rate of the broadcast signal by the AGC circuit when a horizontal synchronizing signal is captured.

In capturing a horizontal synchronizing signal, analog demodulator 20 applies a noise removal process, a frequency separation process, a synchronizing signal separation process, and shaping amplification process on the received broadcast signal. Therefore, the process from the start of reception to capture of a horizontal synchronizing signal is time-consuming, as compared to the calculation of a reception data error rate at digital demodulator 18.

Analog television broadcasts include the NTSC (National System Committee) system employed in Japan, the United States, and the like, the PAL (Phase Alternation by Line) system employed in Germany, UK, and the like, and the SECAM (Sequential Couleur a Memoiré) system employed in France and the like. Since a horizontal synchronizing signal is included in the broadcast signals of all these systems, determination can be made of the reception state depending upon whether a horizontal synchronizing signal is captured or not. Therefore, analog demodulator 20 of the first embodiment may employ any of the systems set forth above.

MPEG decoder 22 decodes the MPEG-2TS signal from digital demodulator 18 into a video signal and audio signal. MPEG decoder 22 outputs the decoded audio signal to an external source (here, monitor 40).

Remote control receiving unit 26 receives an instruction from remote controller 42 for output to digital control unit 10 and analog control unit 11. The user transmits an instruction for a desired operation through remote controller 42.

TABLE 1

| Analog Channel Number |
|---|
| . |
| . |
| . |
| 9 |
| 10 |
| 12 |
| 14 |
| . |
| . |
| . |

Table 1 represents a channel map of analog television broadcasts. Referring to Table 1, this analog channel map is prestored in memory 11B in analog control unit 11. The analog channel map has channels corresponding to broadcasts that can be received arranged in the ascending order of the channel number. The analog channel map of Table 1 has the channel numbers of 9, 10, 12, and 14 arranged in order.

TABLE 2

| Digital Channel Number |
|---|
| . |
| . |
| . |
| 9-1 |
| 9-2 |
| 10-1 |
| 20-1 |
| 20-2 |
| . |
| . |
| . |

Table 2 represents a channel map of digital television broadcasts. Referring to Table 2, this digital channel map is prestored in memory 10B of digital control unit 10. The digital channel map has channels corresponding to broadcasts that can be received arranged in the ascending order of the channel number. In the digital channel map of Table 2, the channel numbers of 9-1, 9-2, 10-1, 20-1 and 20-2 are arranged in order.

In digital television broadcasting, a plurality of broadcasts may be transmitted simultaneously through the frequency range represented by one physical channel.

In the present embodiment, the channel number of a digital television broadcast is represented as "N-n". "N" is the channel number corresponding to the number of the physical channel. For example, there is the case where the channel number of the actual physical channel is 9, directly corresponding to N=9, and the case where the channel number of the actual physical channel is a number other than 9 (for example, 27), but represented as N=9 in relationship.

Additionally, "n" is the channel number of the logical channel assigned to each of a plurality of broadcasts included in one physical channel of channel number N. For example, when there are two broadcasts included in the physical channel of channel number "9", the logical channel is assigned a number in ascending order from 1, so that the channel number of respective broadcasts are designated "9-1" and "9-2".

The channel number in analog television broadcasts is represented only by the physical channel number of "N". In view of the higher/lower relationship of the channel number of an analog television broadcast and a digital television broadcast, the channel number of an analog television broadcast is taken as "N-0".

In other words, the analog channel of channel number "N" is a channel lower than the digital channel of channel number "N-1", and higher than the digital channel of "(N-1)-n".

For example, respective channels in Tables 1 and 2 are 9, 9-1, 9-2, 10, 10-1, 10-2, 12, 14, 20-1, 20-2, when arranged in the ascending order.

The analog channel map and digital channel map may be obtained from an EPG (Electronic Program Guide) or may be selected from the channel map of respective districts preset in broadcast receiver device 1, depending upon the district where broadcast receiver device 1 is installed.

Further, each of the analog channel map and digital channel map may be a portion of another table (for example, a program table) stored in memory 11B and memory 10B. In other words, the channel map including the information of channel numbers arranged in ascending order may be included as a portion of a table including information of channel numbers arranged in ascending order together with other information such as the program information.

Figure 2:
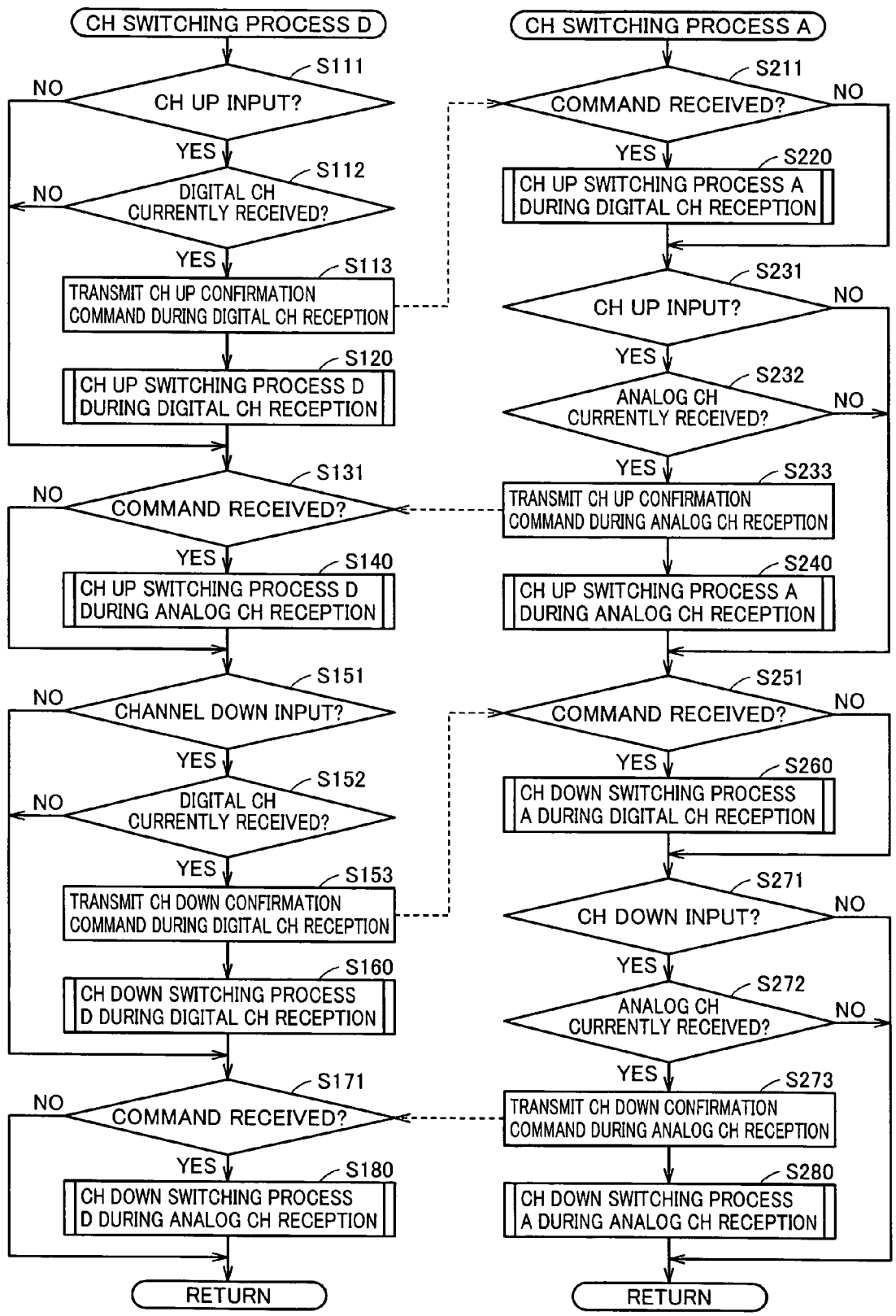
FIG. 2 is a flow chart of a channel switching process according to the first embodiment of the present invention.

Referring to FIG. 2, the channel switching process includes a channel switching process D corresponding to the flow chart at the left side of FIG. 2, executed by CPU 10A of digital control unit 10, and a channel switching process A corresponding to the flow chart at the right side of FIG. 2, executed by CPU 11A of analog control unit 11.

In channel switching process D, CPU 10A of digital control unit 10 determines whether a channel up signal corresponding to an instruction of switching the currently received channel to the next channel in ascending order has been received from remote control receiving unit 26 (step S111). When determination is made of receiving a channel up signal (YES at step S111), CPU 10A of digital control unit 10 determines whether the currently received channel is a channel of a digital television broadcast (hereinafter, referred to as "digital channel") (step S112).

When determination is made of not receiving a channel up signal (NO at step S111), or not currently receiving a digital channel (NO at step S112), CPU 10A of digital control unit 10 proceeds to step S131.

When determination is made of a digital channel being received (YES at step S112), CPU 10A of digital control unit 10 transmits a digital channel reception channel up confirmation command (hereinafter, referred to as "Dup confirmation command") to analog control unit 11 (step S113). The Dup confirmation command is to indicate that a channel up signal has been received during reception of a digital channel.

CPU 10A of digital control unit 10 executes a digital channel reception channel up switching process D (hereinafter, referred to as "Dup process D") (step S120). Then, CPU 10A of digital control unit 10 proceeds to step S131. Dup process D will be described afterwards with reference to FIG. 3.

In channel switching process A, CPU 11A of analog control unit 11 determines whether a Dup confirmation command has been received from digital control unit 10 (step S211). When determination is made of a Dup confirmation command not received (NO at step S211), CPU 11A of analog control unit 11 proceeds to step S231.

When determination is made of a Dup confirmation command being received (YES at step S211), CPU 11A of analog control unit 11 executes a digital channel reception channel up switching process A (hereinafter, referred to as "Dup process A") (step S220). Then, CPU 11A of analog control unit 11 proceeds to step S231. Dup process A will be described with reference to FIG. 3.

Figure 3:
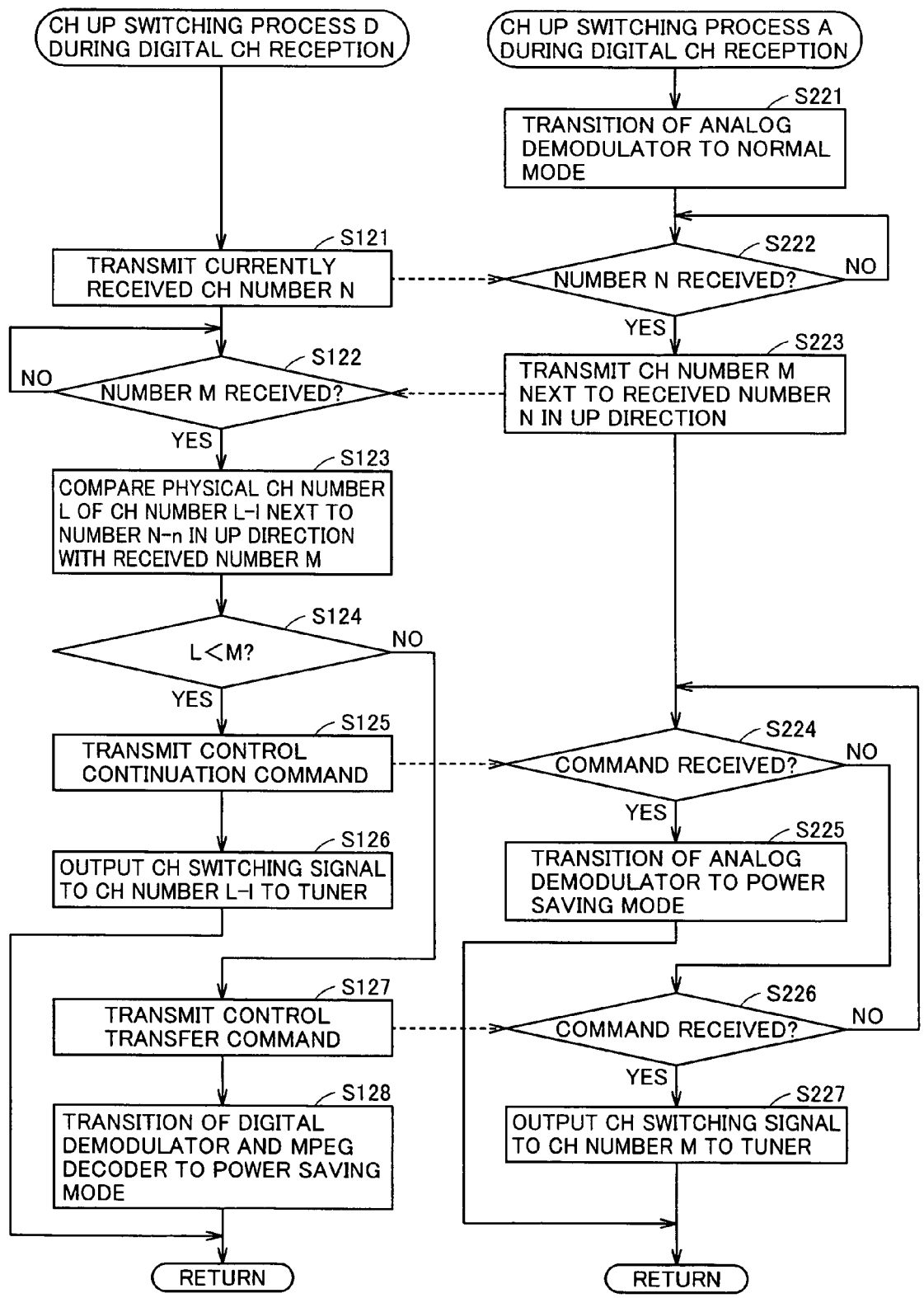
FIG. 3 is a flow chart of a channel up switching process during reception of a digital channel (hereinafter, referred to as "Dup process") according to the first embodiment of the present invention.

Referring to FIG. 3, the Dup process includes a Dup process D corresponding to the flow chart at the left side of FIG. 3, executed by CPU 10A of digital control unit 10, and a Dup process A corresponding to the flow chart at the right side of FIG. 3, executed by CPU 11A of analog control unit 11.

In Dup process D, CPU 10A of digital control unit 10 transmits a physical channel number "N" of channel number "N-n" of the channel currently received to analog control unit 11 (step S121).

At Dup process A, CPU 11A of analog control unit 11 causes transition of analog demodulator 20 to a normal mode from a power saving mode (step S221).

As used herein, a power saving mode refers to the mode in which power supply to the portion corresponding to the main process is suppressed, and power is supplied to only a portion including the region that controls power supply to the region corresponding to the main process. A normal mode refers to the mode in which power is supplied to the entire device including the portion corresponding to the main process and a portion of the entire device including the portion controlling power supply to the portion corresponding to the main process. The portion corresponding to the main process refers to, for example, the portion carrying out the process of demodulating an analog broadcast signal, when the device is an analog demodulator 20.

Then, CPU 11A of analog control unit 11 determines whether physical channel number "N" has been received from digital control unit 10 (step S222). When determination is made that physical channel number "N" has not been received (NO at step S222), CPU 11A of analog control unit 11 repeats step S222.

When determination is made that physical channel number "N" has been received (YES at step S222), CPU 11A of analog control unit 11 reads out channel number "M" that is next to the received physical channel number "N" in the ascending order from the analog channel map stored in memory 11B, and transmits that channel number "M" to digital control unit 10 (step S223). Then, CPU 11A of analog control unit 11 proceeds to step S224.

At Dup process D, CPU 10A of digital control unit 10 determines whether channel number "M" has been received from analog control unit 11 (step S122). When determination is made that channel number "M" has not been received (NO at step S122), CPU 10A of digital control unit 10 repeats step S122.

When determination is made that channel number "M" has been received (YES at step S122), CPU 10A of digital control unit 10 reads out channel number "L-1" that is next to channel number "N-n" in the ascending order from the digital channel map stored in memory 10B, and compares physical channel number "L" of that channel number "L-1" with the received channel number "M" (step S123). CPU 10A of channel control unit 10 determines whether L<M is established or not (step S124).

When determination is made of L<M being established (YES at step S124), CPU 10A of digital control unit 10 transmits a control continuation command to analog control unit 11 (step S125). The control continuation command is to inform analog control unit 11 and digital control unit 10 to continue control of broadcast signal reception.

CPU 10A of digital control unit 10 outputs a channel switching signal indicating channel switching to channel number "L−1" to tuner 16 (step S126). Then, CPU 10A of digital control unit 10 returns control to the main process from which this Dup process D was invoked.

When determination is made that L<M is not established (NO at step S124), CPU 10A of digital control unit 10 transmits a control transfer command to analog control unit 11 (step S127). This control transfer command informs digital control unit 10 and analog control unit 11 that the control of broadcast signal reception by digital control unit 10 and analog control unit 11 is to be changed.

Then, CPU 10A of digital control unit 10 causes transition of digital demodulator 18 and MPEG decoder 22 to a power saving mode from a normal mode (step S128). Subsequently, CPU 10A of digital control unit 10 returns control to the main process from which this Dup process D was invoked.

At Dup process A, CPU 11A of analog control unit 11 determines whether a control continuation command has been received from digital control unit 10 (step S224). When determination is made that a control continuation command has not been received (NO at step S224), CPU 11A of analog control unit 11 determines whether a control transfer command has been received or not (step S226). When determination is made that a control transfer command has not been received (NO at step S226), CPU 11 of analog control unit 11 returns control to step S224.

When determination is made that a control continuation command has been received (YES at step S224), CPU 11A of analog control unit 11 causes transition of analog demodulator 20 to a power saving mode from a normal mode (step S225). Then, CPU 11A of analog control unit 11 returns control to the main process from which this Dup process A was invoked.

When determination is made that a control transfer command has been received (YES at step S226), CPU 11A of analog control unit 11 outputs to tuner 16 a channel switching signal instructing channel switching to channel number "M" (step S227). Then, CPU 11A of analog control unit 11 returns control to the main process from which this Dup process A was invoked.

Thus, when a channel up signal is received during reception of a digital channel, Dup process D and Dup process A are executed. In the case where the next channel in the ascending order direction is a digital channel, control is effected to switch to that digital channel, so that digital control unit 10 continues control of broadcast signal reception whereas analog demodulator 20 enters a power saving mode. In the case where the next channel in the ascending order direction is an analog channel, control is effected to switch to that analog channel. Control of broadcast signal reception is transferred to analog control unit 11, and digital demodulator 18 and MPEG decoder 22 enter a power saving mode.

Returning to FIG. 2, at channel switching process A, CPU 11A of analog control unit 11 determines whether the aforementioned channel up signal has been received from remote control receiving unit 26 (step S231). When determination is made that a channel up signal has been received (YES at step S231), CPU 11A of analog control unit 11 determines whether the channel currently received is a channel of an analog television broadcast (hereinafter, referred to as "analog channel") (step S232).

When determination is made that a channel up signal has not been received (NO at step S231), or determination is made that an analog channel is not currently received (NO at step S232), CPU 11A of analog control unit 11 proceeds to step S251.

When determination is made that an analog channel is currently received (YES at step S232), CPU 11A of analog control unit 11 transmits an analog channel reception channel up confirmation command (hereinafter, referred to as "Aup confirmation command") to digital control unit 10 (step S233). This Aup confirmation command is to indicate that a channel up signal has been received during reception of an analog channel.

Then, CPU 11A of analog control unit 11 executes an analog channel reception channel up switching process A (hereinafter, referred to as "Aup process A") (step S240). Subsequently, CPU 11A of analog control unit 11 proceeds to step S251. Aup process A will be described with reference to FIG. 4 afterwards.

At channel switching process D, CPU 10A of digital control unit 10 determines whether an Aup confirmation command has been received from analog control unit 11 (step S131). When determination is made that the command has not been received (NO at step S131), CPU 10A of digital control unit 10 proceeds to step S151.

When determination is made that the command has been received (YES at step S131), CPU 10A of digital control unit 10 executes an analog channel reception channel up switching process D (hereinafter, referred to as "Aup process D") (step S140). Then, CPU 10A of digital control unit 10 proceeds to step S151. Aup process D will be described with reference to FIG. 4.

Figure 4:
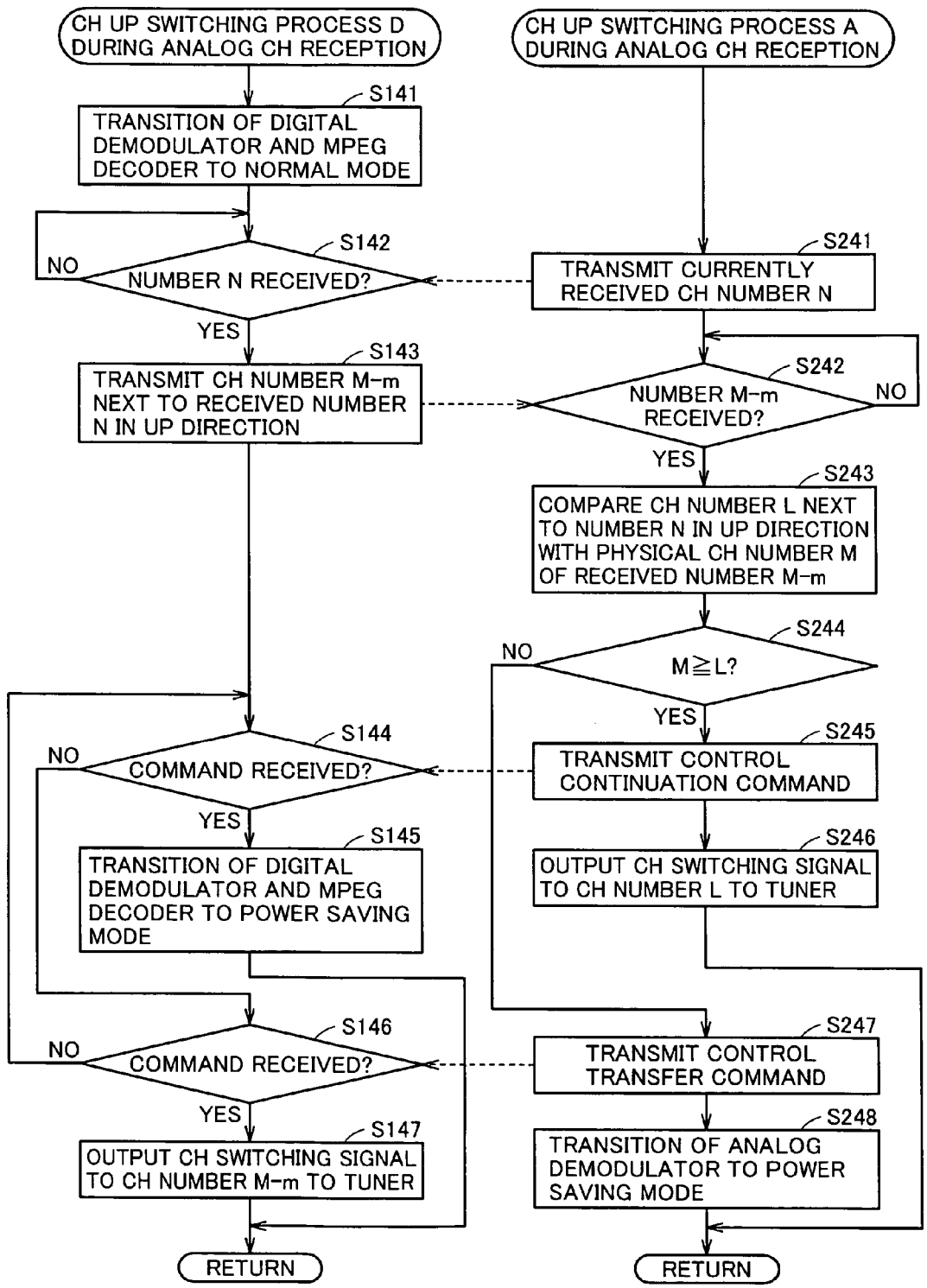
FIG. 4 is a flow chart of a channel up switching process during reception of an analog channel (hereinafter, referred to as "Aup process") according to the first embodiment of the present invention.

Referring to FIG. 4, the Aup process includes an Aup process D corresponding to the flow chart at the left side of FIG. 4, executed by CPU 10A of digital control unit 10, and an Aup process A corresponding to the flow chart at the right side of FIG. 4 executed by CPU 11A of analog control unit 11.

At Aup process A, CPU 11A of analog control unit 11 transmits physical channel number "N" of the currently received channel to digital control unit 10 (step S241).

At Aup process D, CPU 10A of digital control unit 10 causes transition of digital demodulator 18 and MPEG decoder 22 to a normal mode from a power saving mode (step S141).

CPU 10A of digital control unit 10 determines whether physical channel number "N" has been received from analog control unit 11 (step S142). When determination is made that physical channel number "N" has not been received (NO at step S142), CPU 10A of digital control unit 10 repeats step S142.

When determination is made that physical channel number "N" has been received (YES at step S142), CPU 10A of digital control unit 10 reads out channel number "M-m" that is next to the received physical channel number "N" in the ascending order direction from the digital channel map stored in memory 10B, and transmits that channel number "M-m" to analog control unit 11 (step S143). Then, CPU 10A of digital control unit 10 proceeds to step S144.

At Aup process A, CPU 11A of analog control unit 11 determines whether channel number "M-m" has been received from digital control unit 10 (step S242). When determination is made that channel number "M-m" has not been received (NO at step S242), CPU 11A of analog control unit 11 repeats step S242.

When determination is made that channel number "M-m" has been received (YES at step S242), CPU 11A of analog control unit 11 reads out channel number "L" that is next to channel number "N" in the ascending order direction from the analog channel map stored in memory 11B, and compares that channel number "L" with physical channel number "M" of the received channel number "M-m" (step S243). Then, CPU 11A of analog control unit 11 determines whether M≧L is established or not (step S244).

When determination is made that M≧L is established (YES at step S244), CPU 11A of analog control unit 11 transmits the aforementioned control continuation command to digital control unit 10 (step S245).

Then, CPU 11A of analog control unit 11 outputs a channel switching signal indicating channel switching to channel number "L" to tuner 16 (step S246). Subsequently, CPU 11A of analog control unit 11 returns control to the main process from which this Aup process A was invoked.

When determination is made that M≧L is not established (NO at step S244), CPU 11A of analog control unit 11 transmits a control transfer command to digital control unit 10 (step S247).

CPU 11A of analog control unit 11 causes transition of analog demodulator 20 to a power saving mode from a normal mode (step S248). Then, CPU 11A of analog control unit 11 returns control to the main process from which this Aup process A was invoked.

At Aup process D, CPU 10A of digital control unit 10 determines whether a control continuation command has been received from analog control unit 11 (step S144). When determination is made that a control continuation command has not been received (NO at step S144), CPU 10A of digital control unit 10 determines whether a control transfer command has been received or not (step S146). When determination is made that a control transfer command has not been received (NO at step 146), CPU 10A of digital control unit 10 returns control to step S144.

When determination is made that a control continuation command has been received (YES at step S144), CPU 10A of digital control unit 10 causes transition of digital demodulator 18 and MPEG decoder 22 to a power saving mode from a normal mode (step S145). Then, CPU 10A of digital control unit 10 returns control to the main process from which this Aup process D was invoked.

When determination is made that a control transfer command has been received (YES at step S146), CPU 10A of digital control unit 10 outputs to tuner 16 a channel switching signal indicating channel switching to channel number "M-m" (step S147). Then, CPU 10A of digital control unit 10 returns control to the main process from which this Aup process D was invoked.

When a channel up signal is received during reception of an analog channel, Aup process D and Aup process A are executed. In the case where the next channel in the ascending order direction is an analog channel, control is effected to switch to that analog channel. Analog control unit 11 continues control of broadcast signal reception, and digital demodulator 18 and MPEG decoder 22 enter a power saving mode. In the case where the next channel in the ascending order direction is a digital channel, control is effected to switch to that digital channel. Control of broadcast signal reception is transferred to digital control unit 10, and analog demodulator 20 enters a power saving mode.

Returning to channel switching process D in FIG. 2, CPU 10A of digital control unit 10 determines whether a channel down signal indicating switching of the channel next to the currently received channel in the descending order has been received from remote control receiving unit 26 (step S151). When determination is made that a channel down signal has been received (YES at step S151), CPU 10A of digital control unit 10 determines whether the currently received channel is a digital channel or not (step S1152).

When determination is made that a channel down signal has not been received (NO at step S151), or when determination is made that a digital channel is not currently received (NO at step S152), CPU 10A of digital control unit 10 proceeds to step S171.

When determination is made that a digital channel is being received (YES at step S152), CPU 10A of digital control unit 10 transmits a digital channel reception channel down confirmation command (hereinafter, referred to as "Ddown confirmation command") to analog control unit 11 (step S153). This Ddown confirmation command is to inform reception of a channel down signal during reception of a digital channel to analog control unit 11.

CPU 10A of digital control unit 10 executes a digital channel reception channel down switching process D (hereinafter, referred to as "Ddown process D") (step S160). Then, CPU 10A of digital control unit 10 proceeds to step S171. Ddown process D will be described afterwards with reference to FIG. 5.

In channel switching process A, CPU 11A of analog control unit 11 determines whether a Ddown confirmation command has been received from digital control unit 10 (step S251). When determination is made that the command has not been received (NO at step S251), CPU 11A of analog control unit 11 proceeds to step S271.

When determination is made that the command has been received (YES at step S251), CPU 11A of analog control unit 11 executes a digital channel reception channel down switching process A (hereinafter, referred to as "Ddown process A") (step S260). Then, CPU 11A of analog control unit 11 proceeds to step S271. Ddown process A will be described with reference to FIG. 5.

Figure 5:
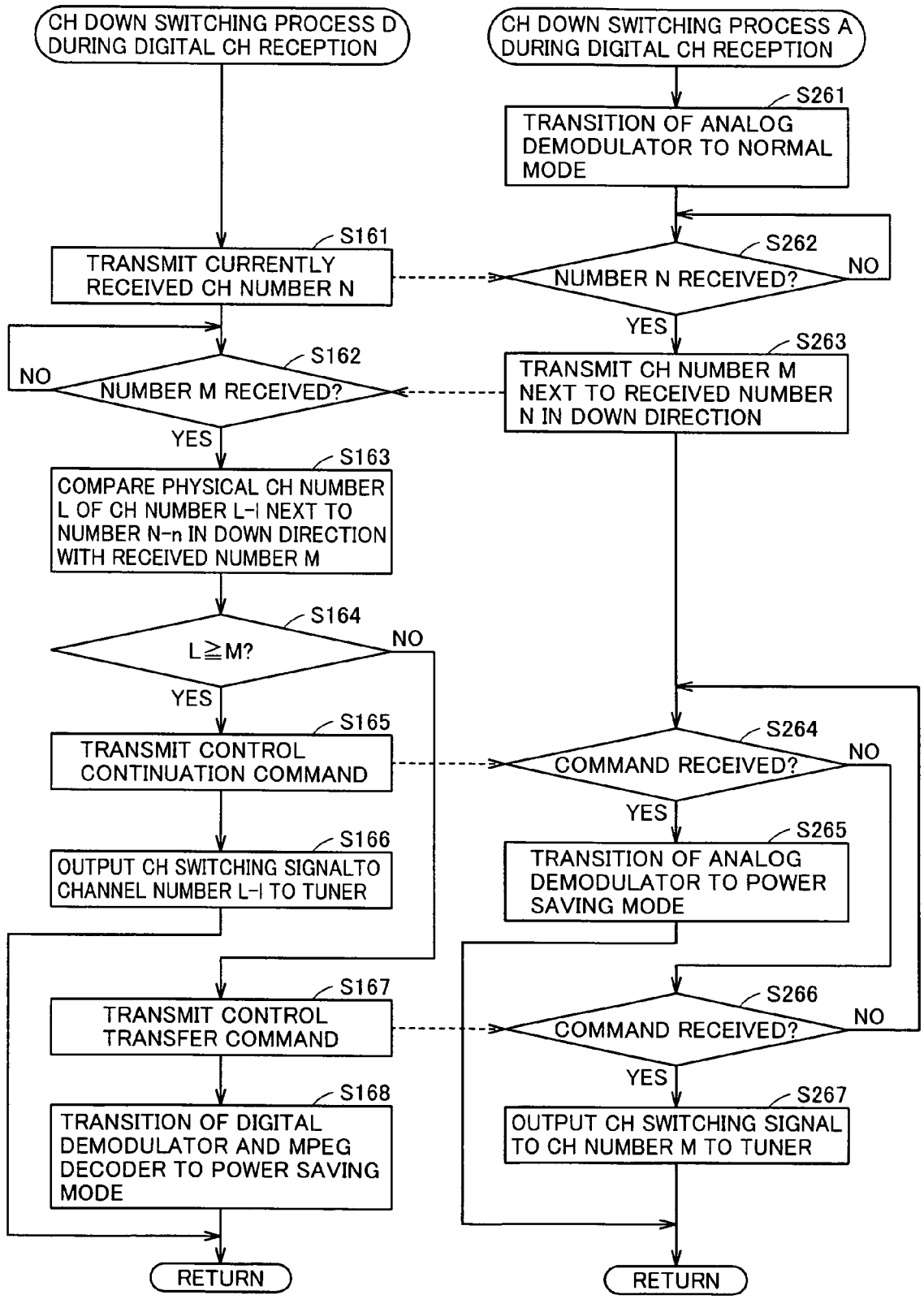
FIG. 5 is a flow chart of a channel down switching process during reception of a digital channel (hereinafter, referred to as "Ddown process") according to the first embodiment of the present invention.

Referring to FIG. 5, the Ddown process includes a Ddown process D corresponding to the flow chart at the left side of FIG. 5, executed by CPU 10A of digital control unit 10, and a Ddown process A corresponding to the flow chart at the right side of FIG. 5, executed by CPU 11A of analog control unit 11.

At Ddown process D, CPU 10A of digital control unit 10 transmits physical channel number "N" of channel number "N-n" of the currently received channel to analog control unit 11 (step S161).

At Ddown process A, CPU 11A of analog control unit 11 causes transition of analog demodulator 20 to a normal mode from a power saving mode (step S261).

CPU 11A of analog control unit 11 determines whether physical channel number "N" has been received from digital control unit 10 (step S262). When determination is made that physical channel "N" has not been received (NO at step S262), CPU 11A of analog control unit 11 repeats step S262.

When determination is made that physical channel number "N" has been received (YES at step S262), CPU 11A of analog control unit 11 reads out channel number "M" of the channel next to the received physical channel number "N" in the ascending order direction from the analog channel map stored in memory 11B, and transmits that channel number "M" to digital control unit 10 (step S263). Then, CPU 11A of analog control unit 11 proceeds to step S264.

At Ddown process D, CPU 10A of digital control unit 10 determines whether channel number "M" has been received from analog control unit 11 (step S162). When determination is made that channel number "M" has not been received (NO at step S162), CPU 10A of digital control unit 10 repeats step S162.

When determination is made that channel number "M" has been received (YES at step S162), CPU 10A of digital control unit 10 reads out channel number "L−1" that is next to channel number "N-n" in the descending order direction from the digital channel map stored in memory 10B, and compares physical channel number "L" of channel number "L−1" with the received channel number "M" (step S163). Then, CPU 10A of digital control unit 10 determines whether $L \geq M$ is established or not (step S164).

When determination is made that $L \geq M$ is established (YES at step S164), CPU 10A of digital control unit 10 transmits a control continuation command to analog control unit 11 (step S165).

CPU 10A of digital control unit 10 outputs to tuner 16 a channel switching signal indicating channel switching to channel number "L−1" (step S166). Then, CPU 10A of digital control unit 10 returns control to the main process from which this Ddown process D was invoked.

When determination is made that $L \geq M$ is not established (NO at step S164), CPU 10A of digital control unit 10 transmits a control transfer command to analog control unit 11 (step S167).

CPU 10A of digital control unit 10 causes transition of digital demodulator 18 and MPEG decoder 22 to a power saving mode from a normal mode (step S168). Then, CPU 10A of digital control unit 10 returns control to the main process from which this Ddown process D was invoked.

At Ddown process A, CPU 11A of analog control unit 11 determines whether a control continuation command has been received from digital control unit 10 (step S264). When determination has been made that a control continuation command has not been received (NO at step S264), CPU 11A of analog control unit 11 determines whether a control transfer command has been received or not (step S266). When determination is made that a control transfer command has not been received (NO at step S266), CPU 11A of analog control unit 11 returns control to step S264.

When determination is made that a control continuation command has been received (YES at step S264), CPU 11A of analog control unit 11 causes transition of analog demodulator 20 to a power saving mode from a normal mode (step S265). Then, CPU 11A of analog control unit 11 returns control to the main process from which this Ddown process A was invoked.

When determination is made that a control transfer command has been received (NO at step S266), CPU 11A of analog control unit 11 outputs a channel switching signal indicating channel switching to channel number "M" to tuner 16 (step S267). Then, CPU 11A of analog control unit 11 returns control to the main process from which this Ddown process A was invoked.

Thus, when a channel down signal is received during reception of a digital channel, Ddown process D and Ddown process A are executed. In the case where the next channel in the descending order direction is a digital channel, control is effected to switch to that digital channel. Digital control unit 10 continues control of broadcast signal reception, and analog demodulator 20 enters a power saving mode. In the case where the next channel in the descending order direction is an analog channel, control is effected to switch to that analog channel. Control of broadcast signal reception is transferred to analog control unit 11, and digital demodulator 18 and MPEG decoder 22 enter a power saving mode.

Returning back to channel switching process A in FIG. 2, CPU 11A of analog control unit 11 determines whether the aforementioned channel down signal has been received from remote control receiving unit 26 or not (step S271). When determination is made that a channel down signal has been received (YES at step S271), CPU 11A of analog control unit 11 determines whether the currently received channel is an analog channel (step S272).

When determination is made that a channel down signal has not been received (NO at step S271), or when determination is made that an analog channel is not currently being received (NO at step S272), CPU 11A of analog control unit 11 returns control to the main process from which this channel switching process A was invoked.

When determination is made that an analog channel is currently being received (YES at step S272), CPU 11A of analog control unit 11 transmits an analog channel reception channel down confirmation command (hereinafter, referred to as "Adown confirmation command") to digital control unit 10 (step S273). This Adown confirmation command is to inform digital control unit 10 that a channel down signal has been received during reception of an analog channel.

Then, CPU 11A of analog control unit 11 executes an analog channel reception channel down switching process A (hereinafter, referred to as "Adown process A") (step S280). Then, CPU 11A of analog control unit 11 returns control to the main process from which this channel switching process A was invoked. Adown process A will be described afterwards with reference to FIG. 6.

At channel switching process D, CPU 10A of digital control unit 10 determines whether an Adown confirmation command has been received from analog control unit 11 (step S171). When determination is made that the command has not been received (NO at step S171), CPU 10A of digital control unit 10 returns control to the main process from which this channel switching process D was invoked.

When determination is made that the command has been received (YES at step S171), CPU 10A of digital control unit 10 executes an analog channel reception channel down switching process D (hereinafter, referred to as "Adown process D") (step S180). Then, CPU 10A of digital control unit 10 returns control to the main process from which this channel switching process D was invoked. Adown process D will be described with reference to FIG. 6.

Figure 6:
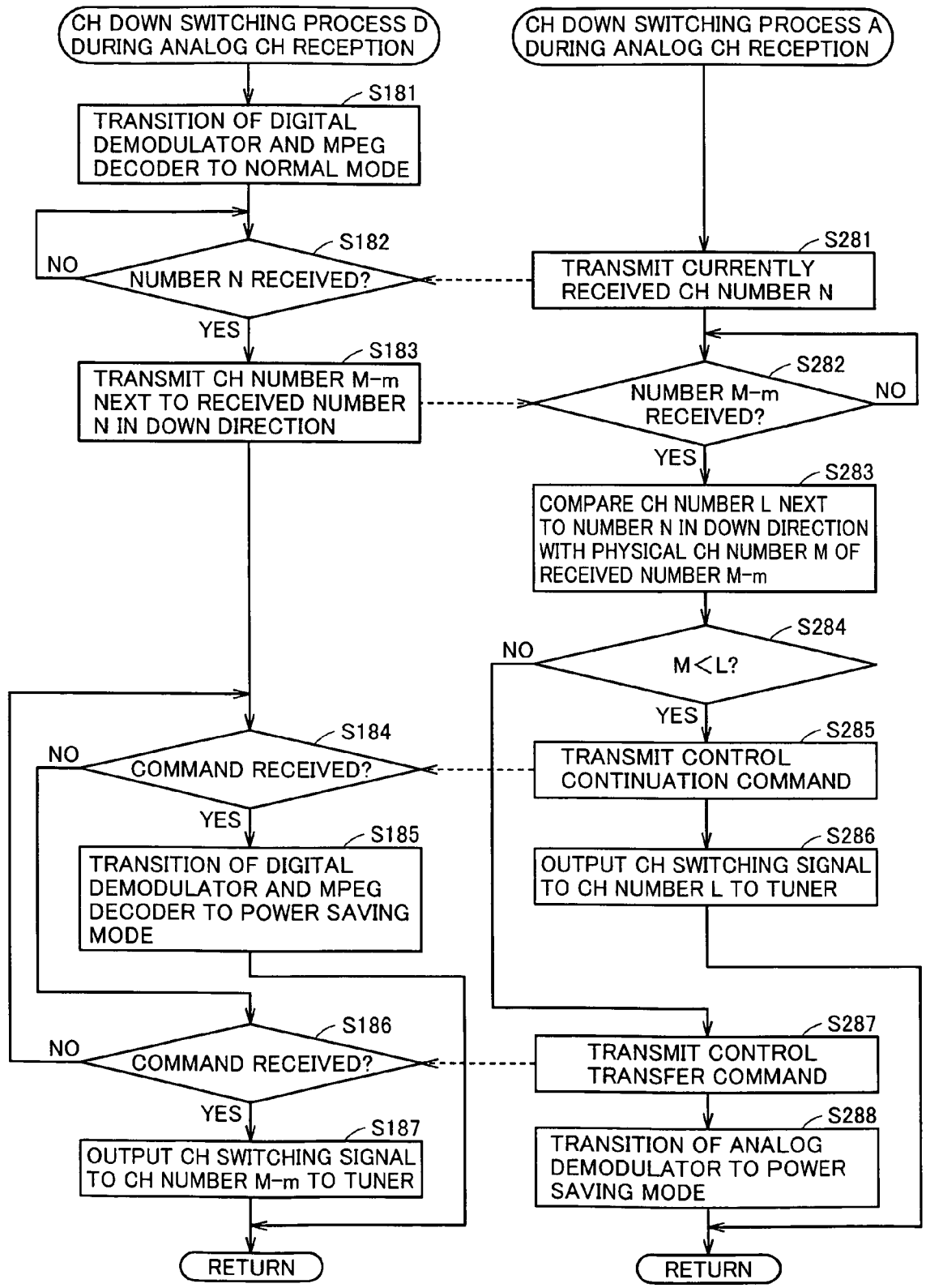
FIG. 6 is a flow chart of a channel down switching process during reception of an analog channel (hereinafter, referred to as "Adown process") according to the first embodiment of the present invention.

Referring to FIG. 6, the Adown process includes an Adown process D corresponding to the flow chart at the left side of FIG. 6, executed by CPU 10A of digital control unit 10, and a Adown process A corresponding to the flow chart at the right side of FIG. 6, executed by CPU 11A of analog control unit 11.

At Adown process A, CPU 11A of analog control unit 11 transmits physical channel number "N" in the currently received channel to digital control unit 10 (step S281).

At Adown process D, CPU 10A of digital control unit 10 causes transition of digital demodulator 18 and MPEG decoder 22 to a normal mode from a power saving mode (step S181).

Then, CPU 10A of digital control unit 10 determines whether physical channel number "N" has been received from analog control unit 11 (step S1182). When determination is made that physical channel number "N" has not been received (NO at step S182), CPU 10A of digital control unit 10 repeats step S182.

When determination is made that physical channel number "N" has been received (YES at step S182), CPU 10A of digital control unit 10 reads out channel number "M-m" of the channel next to the received physical channel number "N" in the descending order direction from the digital channel map stored in memory 10B, and transmits that channel number "M-m" to analog control unit 11 (step S183). Then, CPU 10A of digital control unit 10 proceeds to step S184.

At Adown process A, CPU 11A of analog control unit 11 determines whether channel number "M-m" has been received from digital control unit 10 (step S282). When determination is made that channel number "M-m" has not been received (NO at step S282), CPU 11A of analog control unit 11 repeats step S282.

When determination is made that channel number "M-m" has been received (YES at S282), CPU 11A of analog control unit 11 reads out channel number "L" of the channel next to channel number "N" in the descending order direction from the analog channel map stored in memory 11B, and compares that channel number "L" with physical channel number "M" in the received channel number "M-m" (step S283). Then, CPU 11A of analog control unit 11 determines whether M<L has been established or not (step S284).

When determination is made that M<L has been established (YES at step S284), CPU 11A of analog control unit 11 transmits the aforementioned control continuation command to digital control unit 10 (step S285).

Then, CPU 11A of analog control unit 11 outputs a channel switching signal indicating channel switching to channel number "L" to tuner 16 (step S286). Then, CPU 11A of analog control unit 11 returns control to the main process from which this Adown process A was invoked.

When determination is made that M<L is not established (NO at step S284), CPU 11A of analog control unit 11 transmits a control transfer command to digital control unit 10 (step S287).

Then, CPU 11A of an analog control unit 11 causes transition of analog demodulator 20 to a power saving mode from a normal mode (step S288). Then, CPU 11A of analog control unit 11 returns control to the main process from which this Adown process A was invoked.

At Adown process D, CPU 10A of digital control unit 10 determines whether a control continuation command has been received from analog control unit 11 (step S184). When determination is made that a control continuation command has not been received (NO at step S184), CPU 10A of digital control unit 10 determines whether a control transfer command has been received or not (step S186). When determination is made that a control transfer command has not been received (NO at step S186), CPU 10A of digital control unit 10 returns to step S184.

When determination is made that a control continuation command has been received (YES at step S184), CPU 10A of digital control unit 10 causes transition of digital demodulator 18 and MPEG decoder 22 to a power saving mode from a normal mode (step S185). Then, CPU 10A of digital control unit 10 returns control to the main process from which this Adown process D was invoked.

When determination is made that a control transfer command has been received (YES at step S186), CPU 10A of digital control unit 10 outputs a channel switching signal indicating channel switching to channel number "M-m" to tuner 16 (step S187). Then, CPU 10A of digital control unit 10 returns control to the main process from which this Adown process D was invoked.

Thus, when a channel down signal is received during reception of an analog channel, an Adown process D and an Adown process A are executed. In the case where the next channel in the descending order direction is an analog channel, control is effected to switch to that analog channel. Analog control unit 11 continues control of broadcast signal reception, and digital demodulator 18 and MPEG decoder 22 enter a power saving mode. In the case where the next channel in the descending order direction is a digital channel, control is effected to switch to that digital channel. Control of broadcast signal reception is transferred to digital control unit 10, and analog demodulator 20 enters a power saving mode.

Thus, in the case where a digital channel is currently received (that is, a digital broadcast signal is being extracted by tuner 16) when a channel switching direction command is accepted by broadcast receiver device 1 of the first embodiment, determination is made as to which of the channel number (analog number) of the channel next to the currently received channel in the switching direction according to the order indicated in the analog channel map and the channel number (digital number) of the channel next to the currently received channel in the switching direction according to the order indicated in the digital channel map is closer to the number of the currently received channel (currently received number). When determination is made of being closer to the analog number, switching is effected to the channel of the analog number. When determination is made of being closer to the digital number, switching is effected to the channel of the digital number.

In the case where an analog channel is being received (that is, an analog broadcast signal is being extracted by tuner 16) when an instruction of the switching direction is received, determination is made as to which of the digital number and the analog number is closer to the currently received number. When determination is made of being closer to the digital number, switching is effected to the channel of the digital number. When determination is made of being closer to the analog number, switching is effected to the channel of the analog number.

Thus, the channel is switched to the digital channel or analog channel whose number is closer to the number of the currently received channel, regardless of which of a digital broadcast signal or an analog broadcast signal is currently being extracted. As a result, switching between an analog channel and a digital channel can be effected in a seamless manner.

Also in broadcast receiver device 1, digital control unit 10 inquiries of analog control unit 11 about the analog number. Analog control unit 11 transmits the inquired analog number to digital control unit 10. Digital control unit 10 determines which of the analog number transmitted from analog control unit 11 and the digital number is closer to the currently received number.

In a similar manner, analog control unit 11 inquires of digital control unit 10 about the digital number. Digital control unit 10 transmits the inquired digital number to analog control unit 11. Analog control unit 11 determines which of the digital number transmitted from digital control unit 10 and the analog number is closer to the currently received number.

Therefore, digital control unit 10 and analog control unit 11 cooperate with each other to switch between an analog channel and a digital channel in a seamless manner even in the case where digital control unit 10 and analog control unit 11 are separated physically.

In a digital broadcast signal reception mode at broadcast receiver device 1, digital demodulator 18 and MPEG decoder 22 (hereinafter, referred to as "digital broadcast reception block") enter a power saving state when switched to an analog channel whereas analog demodulator 20 (hereinafter, referred to as "analog broadcast reception block") enters a power saving mode when switched to a digital channel. In an analog broadcast signal reception mode at broadcast receiver device 1, the analog broadcast reception block enters a power saving mode when switched to a digital channel whereas the digital broadcast reception block enters a power saving mode when switched to an analog channel.

By broadcast receiver device 1, transition of either analog broadcast reception block or digital broadcast reception block, whichever is not used, to a power saving mode is effected. As a result, power can be saved at either the analog broadcast reception block or digital broadcast reception block that is not currently used.

Second Embodiment

In the previous first embodiment, the signal from remote control receiving unit 26 is input to both digital control unit 10 and analog control unit 11. Also, tuner 16 is under control of both of digital control unit 10 and analog control unit 11.

In the second embodiment, the signal from remote control receiving unit 26A is input to only digital control unit 12. Tuner 16A is under control of only digital control unit 12. In the second embodiment, description similar to that of the first embodiment will not be repeated.

Figure 7:
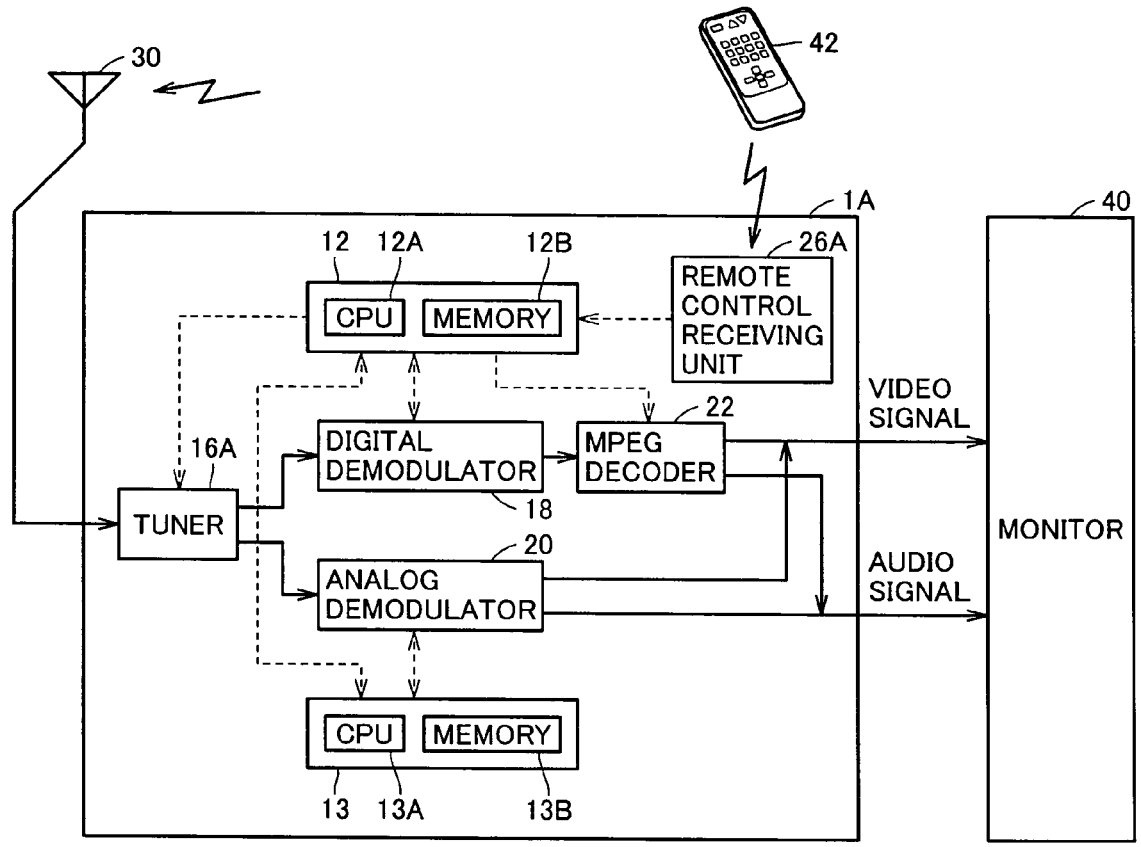
FIG. 7 is a schematic diagram of a configuration of a broadcast receiver device according to a second embodiment of the present invention.

Referring to FIG. 7, a broadcast receiver device 1A includes a digital control unit 12, an analog control unit 13, a tuner 16A, a digital demodulator 18, an analog demodulator 20, an MPEG decoder 22, and a remote control receiving unit 26A. Digital demodulator 18, analog demodulator 20, and MPEG decoder 22 are similar to those of the first embodiment. Therefore, description thereof will not be repeated.

Digital control unit 12 includes a CPU 12A executing a program, and a memory 12B storing a program to be executed, data during program execution, and data corresponding to the result of program execution.

Analog control unit 13 includes a CPU 13A executing a program, and a memory 13B storing a program to be executed, data during program execution, and data corresponding to the result of program execution.

Tuner 16A extracts, from the received broadcast signals, a broadcast signal corresponding to the channel selected in accordance with an instruction from digital control unit 12. When the extracted broadcast signal is a digital broadcast signal, tuner 16A provides the digital broadcast signal to digital demodulator 18. When the extracted broadcast signal is an analog broadcast signal, tuner 16A provides the analog broadcast signal to analog demodulator 20.

Remote control receiving unit 26A receives an instruction from remote controller 42 for output to digital control unit 12. The user transmits an instruction for a desired operation through remote controller 42.

The analog channel map and digital channel map are similar to those described with reference to Tables 1 and 2 in the first embodiment. Therefore, description thereof will not be repeated.

Figure 8:
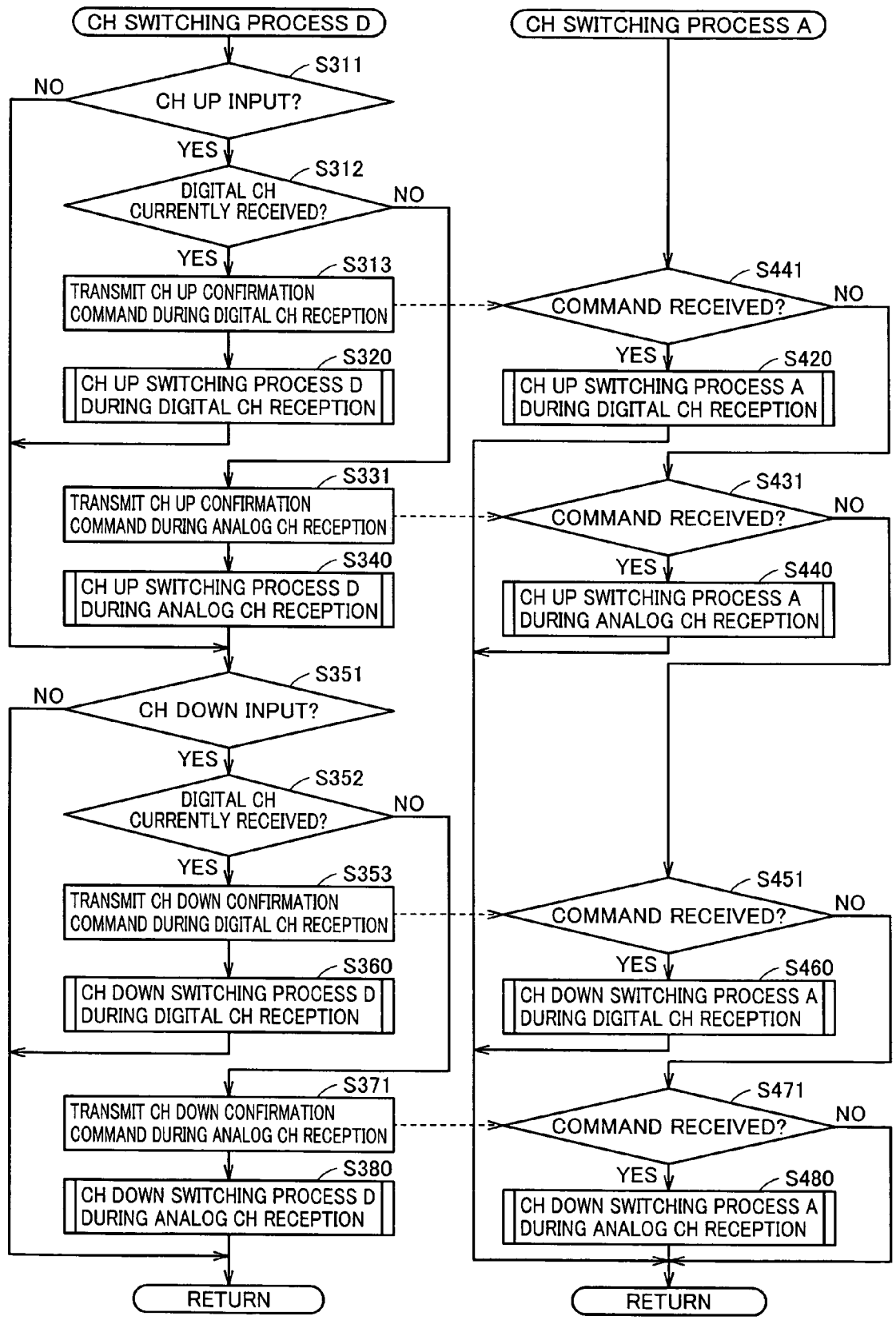
FIG. 8 is a flow chart of a channel switching process according to the second embodiment of the present invention.

Referring to FIG. 8, the channel switching process includes a channel switching process D corresponding to the flow chart at the left side of FIG. 8, executed by CPU 12A of digital control unit 12, and a channel switching process A corresponding to the flow chart at the right side of FIG. 8, executed by CPU 13A of analog control unit 13.

At channel switching process D, CPU 12A of digital control unit 12 determines whether the aforementioned channel up signal is received from remote control receiving unit 26A or not (step S311). When determination is made that a channel up signal has not been received (NO at step S311), CPU 12A of digital control unit 12 proceeds to step S351.

When determination is made that a channel up signal has been received (YES at step S311), CPU 12A of digital control unit 12 determines whether the currently received channel is the digital channel set forth above (step S312).

When determination is made that a digital channel is being received (YES at step S312), CPU 12A of digital control unit 12 transmits a Dup confirmation command to analog control unit 13 (step S313).

Then, CPU 12A of digital control unit 12 executes Dup process D (step S320). Subsequently, CPU 12A of digital control unit 12 proceeds to step S351. Dup process D will be described afterwards with reference to FIG. 9.

At channel switching process A, CPU 13A of analog control unit 13 determines whether a Dup confirmation command has been received from digital control unit 12 (step S411).

When determination is made that a Dup confirmation command has been received (YES at step S411), CPU 13A of analog control unit 13 executes Dup process A (step S420). Then, CPU 13A of analog control unit 13 returns control to the main process from which this channel switching process A was invoked. Dup process A will be described with reference to FIG. 9.

Figure 9:
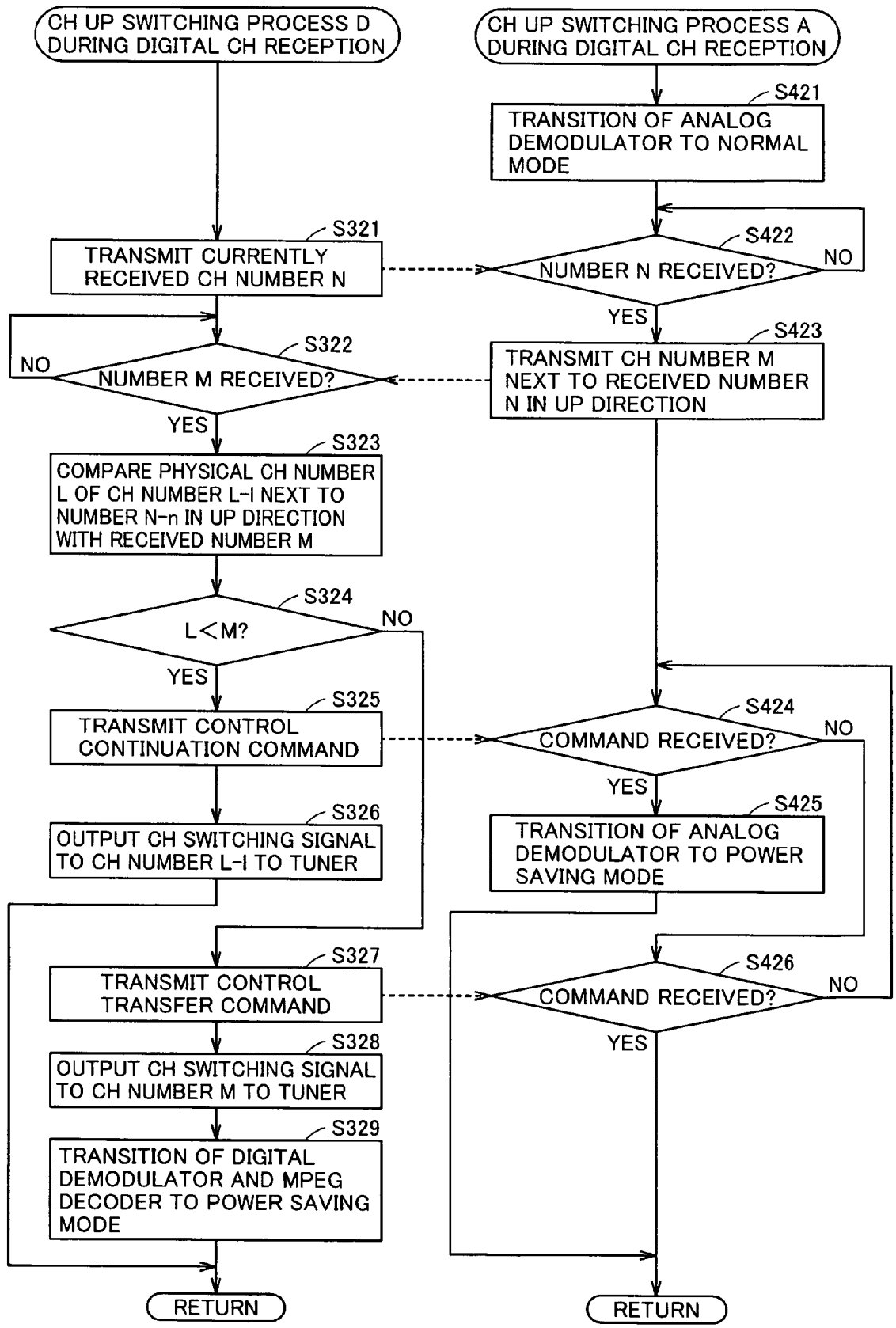
FIG. 9 is a flow chart of a channel up switching process during reception of a digital channel (hereinafter, referred to as "Dup process") according to the second embodiment of the present invention.

Referring to FIG. 9, the Dup process includes a Dup process D corresponding to the flow chart at the left side of FIG. 9, executed by CPU 12A of digital control unit 12, and a Dup process A corresponding to the flow chart at the right side of FIG. 9, executed by CPU 13A of analog control unit 13.

At Dup process D, CPU 12A of digital control unit 12 transmits physical channel number "N" of channel number "N-n" of the currently received channel to analog control unit 13 (step S321).

At Dup process A, CPU 13A of analog control unit 13 causes transition of analog demodulator 20 to a normal mode from a power saving mode (step S421).

Then, CPU 13A of analog control unit 13 determines whether physical channel number "N" has been received from digital control unit 12 (step S422). When determination is made that physical channel number "N" has not been received (NO at step S422), CPU 13A of analog control unit 13 repeats step S422.

When determination is made that physical channel number "N" has been received (YES at step S422), CPU 13A of analog control unit 13 reads out channel number "M" of the channel next to the currently received physical channel number "N" in the ascending order direction from the analog channel map stored in memory 13B, and transmits that channel number "M" to digital control unit 12 (step S423). Then, CPU 13A of analog control unit 13 proceeds to step S424.

At Dup process D, CPU 12A of digital control unit 12 determines whether channel number "M" has been received from analog control unit 13 (step S322). When determination is made that channel number "M" has not been received (NO at step S322), CPU 12A of digital control unit 12 repeats step S322.

When determination is made that channel number "M" has been received (YES at step S322), CPU 12A of digital control unit 12 reads out channel number "L–1" next to channel number "N-n" in the ascending direction order from the digital channel map stored in memory 12B, and compares physical channel number "L" of that channel number "L–1" with the received channel number "M" (step S323). Then, CPU 12A of digital control unit 12 determines whether L<M is established or not (step S324).

When determination is made that L<M is established (YES at step S324), CPU 12A of digital control unit 12 transmits a control continuation command to analog control unit 13 (step S325).

Then, CPU 12A of digital control unit 12 outputs a channel switching signal indicating channel switching to channel number "L−1" to tuner 16A (step S326). Subsequently, CPU 12A of digital control unit 12 returns control to the main process from which this Dup process D was invoked.

When determination is made that L<M is not established (NO at step S324), CPU 12A of digital control unit 12 transmits a control transfer command to analog control unit 13 (step S327).

CPU 12A of digital control unit 12 outputs a channel switching signal indicating channel switching to channel number "M" to tuner 16A (step S328).

CPU 12A of digital control unit 12 causes transition of digital demodulator 18 and MPEG decoder 22 to a power saving mode from a normal mode (step S329). Then, CPU 12A of digital control unit 12 returns control to the main process from which this Dup process D was invoked.

At Dup process A, CPU 13A of analog control unit 13 determines whether a control continuation command has been received from analog control unit 12 (step S424). When determination is made that a control continuation command has not been received (NO at step S424), CPU 13A of analog control unit 13 determines whether a control transfer command has been received or not (step S426). When determination is made that a control transfer command has not been received (NO at step S426), CPU 13A of analog control unit 13 returns to step S424.

When determination is made that a control continuation command has been received (YES at step S424), CPU 13A of analog control unit 13 causes transition of analog demodulator 20 to a power saving mode from a normal mode (step S425). Then, CPU 13A of analog control unit 13 returns control to the main process from which this Dup process A was invoked.

When determination is made that a control transfer command has been received (YES at step S426), CPU 13A of analog control unit 13 returns control to the main process from which this Dup process A was invoked.

Thus, when a channel up signal is received during reception of a digital channel, Dup process D and Dup process A are executed. In the case where the next channel in the ascending order direction is a digital channel, control is effected to switch to that digital channel. Digital control unit 12 continues control of broadcast signal reception, and analog demodulator 20 enters a power saving mode. In the case where the next channel in the ascending order direction is an analog channel, control is effected to switch to that analog channel. Control of broadcast signal reception is transferred to analog control unit 13, and digital demodulator 18 and MPEG decoder 22 enter a power saving mode.

Returning to channel switching process A of FIG. 8, when determination is made that a digital channel is not being received (NO at step S312), CPU 12A of digital control unit 12 transmits an Aup confirmation command to analog control unit 13 (step S331).

CPU 12A of digital control unit 12 executes Aup process D (step S340). Then, CPU 12A of digital control unit 12 proceeds to step S351. Aup process D will be described afterwards with reference to FIG. 10.

At channel switching process A, when determination is made that a Dup confirmation command is not received (NO at step S411), CPU 13A of analog control unit 13 determines whether an Aup confirmation command has been received from digital control unit 12 or not (step S431). When determination is made that the command has not been received (NO at step S431), CPU 13A of analog control unit 13 proceeds to step S451.

When determination is made that the command has been received (YES at step S431), CPU 13A of analog control unit 13 executes Aup process A (step S440). Then, CPU 13A of analog control unit 13 returns control to the main process from which this channel switching process A was invoked. Aup process A will be described with reference to FIG. 10.

Figure 10:
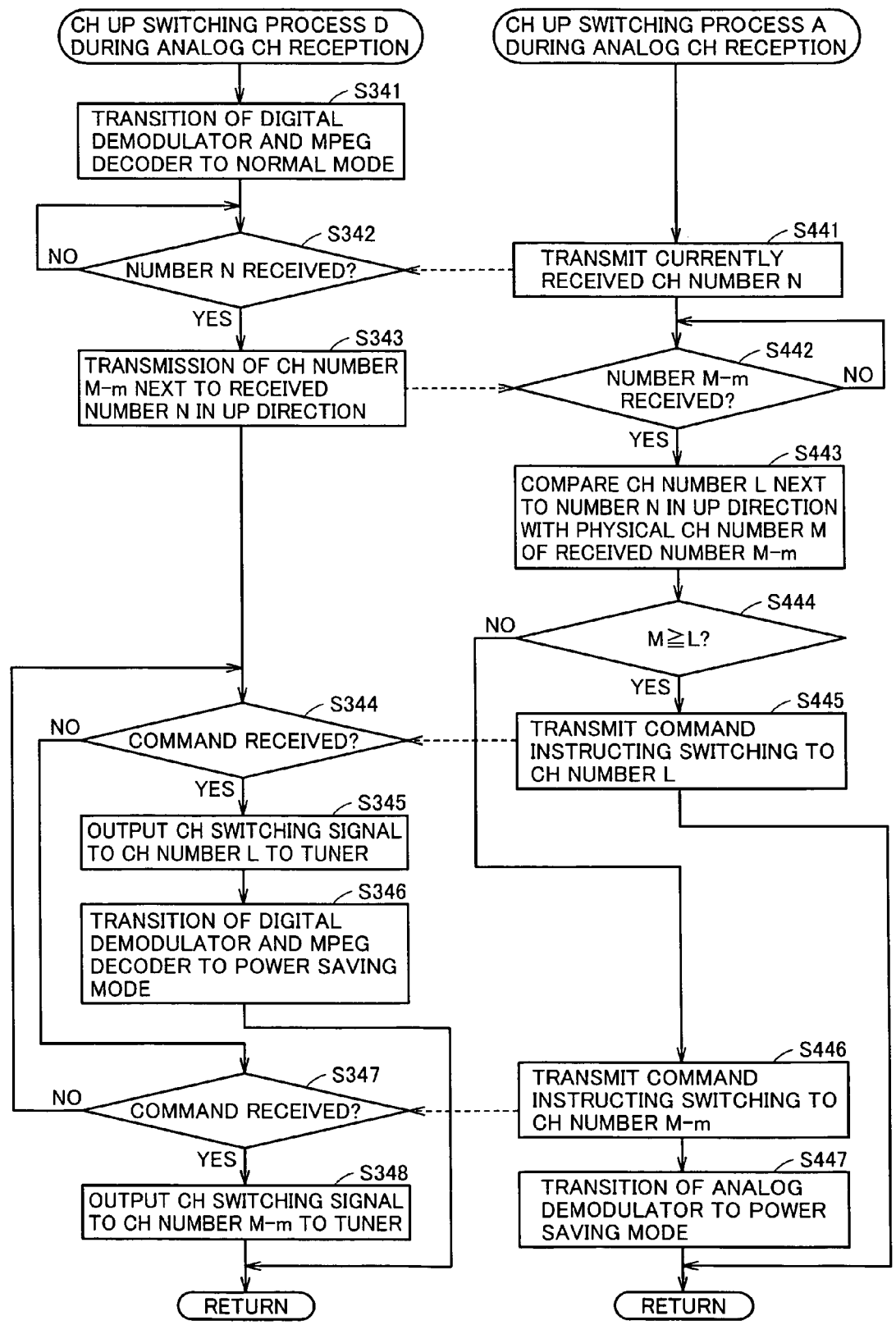
FIG. 10 is a flow chart of a channel up switching process during reception of an analog channel (hereinafter, referred to as "Aup process") according to the second embodiment of the present invention.

Referring to FIG. 10, the Aup process includes an Aup process D corresponding to the flow chart at the left side of FIG. 10, executed by CPU 12A of digital control unit 12, and Aup process A corresponding to the flow chart at the right side of FIG. 10, executed by CPU 10A of analog control unit 13.

At Aup process A, CPU 13A of analog control unit 13 transmits physical channel number "N" of the currently received channel to digital control unit 12 (step S441).

At Aup process D, CPU 12A of digital control unit 12 causes transition of digital demodulator 18 and MPEG decoder 22 to a normal mode from a power saving mode (step S341).

CPU 12A of digital control unit 12 determines whether physical channel number "N" has been received from analog control unit 13 (step S342). When determination is made that physical channel number "N" has not been received (NO at step S342), CPU 12A of digital control unit 12 repeats step S342.

When determination is made that physical channel "N" has been received (YES at step S342), CPU 12A of digital control unit 12 reads out channel number "M-m" of the channel next to the received physical channel number "N" in the ascending order direction from the digital channel map stored in memory 12B, and transmits that channel number "M-m" to analog control unit 13 (step S343). Then, CPU 12A of digital control unit 12 proceeds to step S344.

At Aup process A, CPU 13A of analog control unit 13 determines whether channel number "M-m" has been received from digital control unit 12 (step S442). When determination is made that channel number "M-m" has not been received (NO at step S442), CPU 13A of analog control unit 13 repeats step S442.

When determination is made that channel number "M-m" has been received (YES at step S442), CPU 13A of analog control unit 13 reads out channel number "L" next to channel number "N" in the ascending order direction from the analog channel map stored in memory 13B, and compares that channel number "L" with physical channel number "M" of the received channel number "M-m" (step S443). CPU 13A of analog control unit 13 determines whether M≧L is established or not (step S444).

When determination is made that M≧L is established (YES at step S444), CPU 13A of analog control unit 13 transmits to digital control unit 12 an analog channel switching instruction command that instructs channel switching to channel number "L" (step S445). Then, CPU 13A of analog control unit 13 returns control to the main process from which this Aup process A was invoked.

When determination is made that M≧L is not established (NO at step S444), CPU 13A of analog control unit 13 transmits a digital channel switching instruction command that instructs channel switching to channel number "M-m" to digital control unit 12 (step S446).

CPU 13A of analog control unit 13 causes transition of analog demodulator 20 to a power saving mode from a normal mode (step S447). Then, CPU 13A of analog control unit 13 returns control to the main process from which this Aup process A was invoked.

At Aup process D, CPU 12A of digital control unit 12 determines whether an analog channel switching instruction command to channel number "L" has been received from analog control unit 13 (step S344). When determination is made that an analog channel switching instruction command has not been received (NO at step S344), CPU 12A of digital control unit 12 determines whether a digital channel switching instruction command to channel number "M-m" has been received or not (step S447). When determination is made that a digital channel switching instruction command has not been received (NO at step S447), CPU 12A of digital control unit 12 returns to step S344.

When determination is made that an analog channel switching instruction command has been received (YES at step S344), CPU 12A of digital control unit 12 outputs a channel switching signal that instructs channel switching to an analog channel of channel number "L" is output to tuner 16A (step S345).

CPU 12A of digital control unit 12 causes transition of digital demodulator 18 and MPEG decoder 22 to a power saving mode from a normal mode (step S346). Then, CPU 12A of digital control unit 12 returns control to the main process from which this Aup process D was invoked.

When determination is made that a digital channel switching instruction command has been received (YES at step S347), CPU 12A of digital control unit 12 outputs a channel switching signal that instructs channel switching to the digital channel of channel number "M-m" to tuner 16A (step S348). Then, CPU 12A of digital control unit 12 returns control to the main process from which this Aup process D was invoked.

Thus, when a channel up signal is received during reception of an analog channel, Aup process D and Aup process A are executed. In the case where the next channel in the ascending order direction is an analog channel, control is effected to switch to that analog channel. Analog control unit 13 continues control of broadcast signal reception, and digital demodulator 18 and MPEG decoder 22 enter a power saving mode. In the case where the next channel in the ascending order direction is a digital channel, control is effected to switch to that digital channel. Control of broadcast signal reception is transferred to digital control unit 12, and analog demodulator 20 enters a power saving mode.

Returning to channel switching process D of FIG. 8, CPU 12A of digital control unit 12 determines whether a channel down signal has been received from remote control receiving unit 26A (step S351). When determination is made that a channel down signal has not been received (NO at step S351), CPU 12A of digital control unit 12 returns control to the main process from which this channel switching process D was invoked.

When determination is made that a channel down signal has been received (YES at step S351), CPU 12A of digital control unit 12 determines whether the currently received channel is a digital channel or not (step S352).

When determination is made that a digital channel is currently received (YES at step S352), CPU 12A of digital control unit 12 transmits a Ddown confirmation command to analog control unit 13 (step S353).

Then, CPU 12A of digital control unit 12 executes a Ddown process D (step S360). Subsequently, CPU 12A of digital control unit 12 returns control to the main process from which this channel switching process D was invoked. Ddown process D will be described afterwards with reference to FIG. 11.

In channel switching process A, CPU 13A of analog control unit 13 determines whether a Ddown confirmation command has been received from digital control unit 12 (step S451).

When determination is made that a Ddown confirmation command has been received (YES at step S451), CPU 13A of analog control unit 13 executes a Ddown process A (step S460). Then, CPU 13A of analog control unit 13 returns control to the main process from which this channel switching process A was invoked. Ddown process A will be described with reference to FIG. 11.

Figure 11:
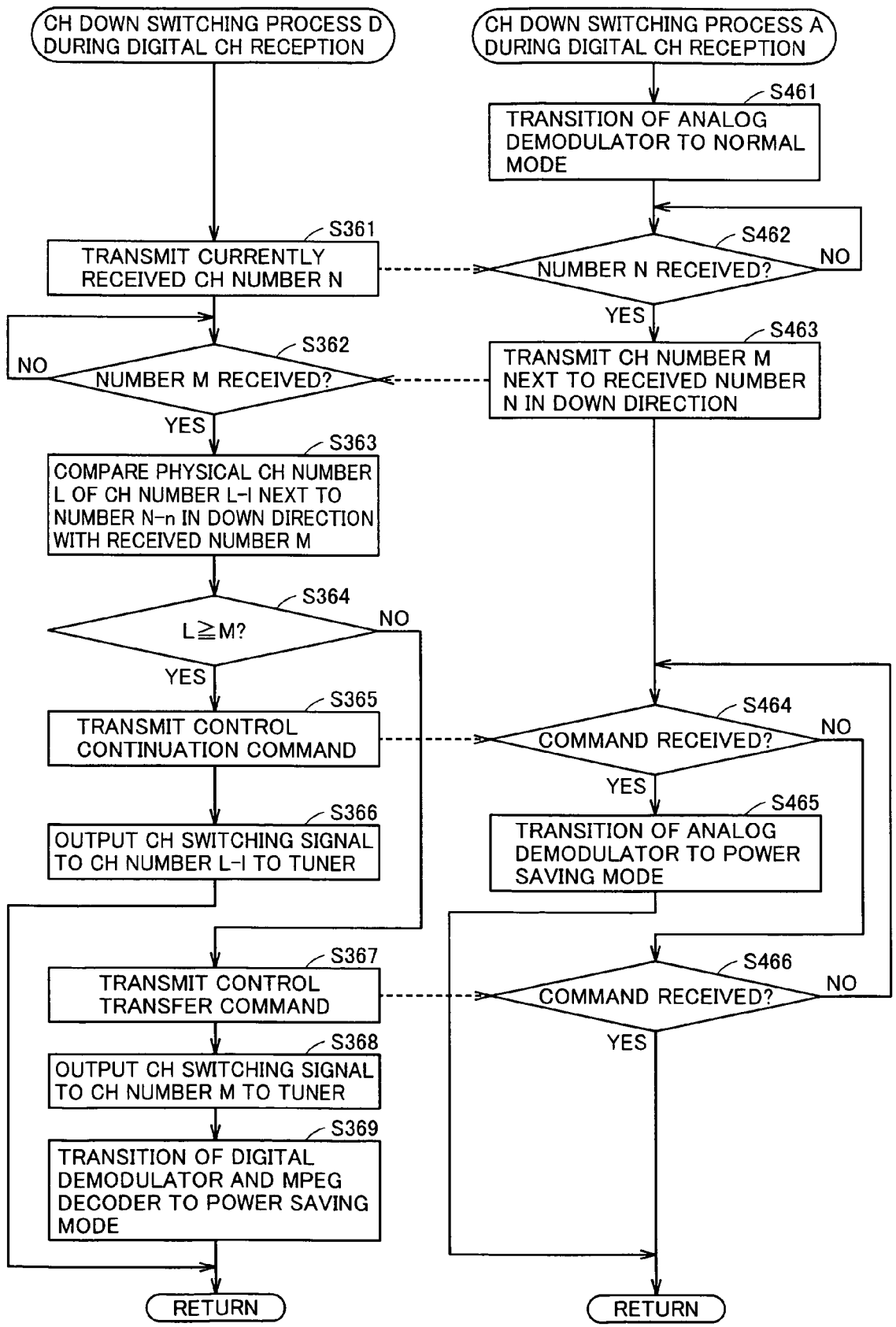
FIG. 11 is a flow chart of a channel down switching process during reception of a digital channel (hereinafter, referred to as "Ddown process") according to the second embodiment of the present invention.

Referring to FIG. 11, the Ddown process includes a Ddown process D corresponding to the flow chart at the left side of FIG. 11 executed by CPU 12A of digital control unit 12, and a Ddown process A corresponding to the flow chart at the right side of FIG. 11, executed by CPU 13A of analog control unit 13.

At Ddown process D, CPU 12A of digital control unit 12 transmits physical channel number "N" of channel number "N-n" of the currently received channel to analog control unit 13 (step S361).

At Ddown process A, CPU 13A of analog control unit 13 causes transition of analog demodulator 20 to a normal mode from a power saving mode (step S461).

CPU 13A of analog control unit 13 determines whether physical channel number "N" has been received from digital control unit 12 (step S462). When determination is made that physical channel number "N" is not received (NO at step S462), CPU 13A of analog control unit 13 repeats step S462.

When determination is made that physical channel number "N" has been received (YES at step S462), CPU 13A of analog control unit 13 reads out channel number "M" of the channel next to the received physical channel "N" in the descending order direction from the analog channel map stored in memory 13B, and transmits that channel number "M" to digital control unit 12 (step S463). Then, CPU 13A of analog control unit 13 proceeds to step S464.

At Ddown process D, CPU 12A of digital control unit 12 determines whether channel number "M" has been received from analog control unit 13 (step 362). When determination is made that channel number "M" has not been received (NO at step S362), CPU 12A of digital control unit 12 repeats step S362.

When determination is made that channel number "M" has been received (YES at step S362), CPU 12A of digital control unit 12 reads out channel number "L-1" next to channel number "N-n" in the descending order direction from the digital channel map stored in memory 12B, and compares physical channel number "L" of that channel number "L-1" with the received channel number "M" (step S363). Then, CPU 12A of digital control unit 12 determines whether $L \geq M$ is established or not (step S364).

When determination is made the $L \geq M$ is established (YES at step S364), CPU 12A of digital control unit 12 transmits a control continuation command to analog control unit 13 (step S365).

CPU 12A of digital control unit 12 outputs a channel switching signal that instructs channel switching to channel number "L-1" to tuner 16A (step S366). Then, CPU 12A of digital control unit 12 returns control to the main process from which this Dup process D was invoked.

When determination is made that $L \geq M$ is not established (NO at step S364), CPU 12A of digital control unit 12 transmits a control transfer command to analog control unit 13 (step S367).

CPU 12A of digital control unit 12 outputs a channel switching signal that instructs channel switching to channel number "M" to tuner 16A (step S368).

Then, CPU 12A of digital control unit 12 causes transition of digital demodulator 18 and MPEG decoder 22 to a power saving mode from a normal mode (step S369). Subsequently, CPU 12A of digital control unit 12 returns control to the main process from which this Ddown process D was invoked.

At Ddown process A, CPU 13A of analog control unit 13 determines whether a control continuation command has been received from digital control unit 12 (step S464). When determination is made that a control continuation command has not been received (NO at step S464), CPU 13A of analog control unit 13 determines whether a control transfer command has been received or not (step S466). When determination is made that a control transfer command has not been received (NO at step S466), CPU 13A of analog control unit 13 returns to step S464.

When determination is made that a control continuation command has been received (YES at step S464), CPU 13A of analog control unit 13 causes transition of analog demodulator 20 to a power saving mode from a normal mode (step S465). Then, CPU 13A of analog control unit 13 returns control to the main process from which this Ddown process A was invoked.

When determination is made that a control transfer command has been received (YES at step S466), CPU 13A of analog control unit 13 returns control to the main process from which this Ddown process A was invoked.

Thus, when a channel down signal is received during reception of digital channel, Ddown process D and Ddown process A are executed. In the case where the next channel in the descending order direction is a digital channel, control is effected to switch to the digital channel. Digital control unit 12 continues control of broadcast signal reception, and analog demodulator 20 enters a power saving mode. In the case where the next channel in the descending order direction is an analog channel, control is effected to switch to that analog channel. Control of broadcast signal reception is transferred to analog control unit 13, and digital demodulator 18 and MPEG decoder 22 enter a power saving mode.

Returning to channel switching process A of FIG. 8, when determination is made that a digital channel is not currently received (NO at step S352), CPU 12A of digital control unit 12 transmits an Adown confirmation command to analog control unit 13 (step S371).

CPU 12A of digital control unit 12 executes an Adown process D (step S380). Then, CPU 12A of digital control unit 12 returns control to the main process from which this channel switching process D was invoked. Adown process D will be described afterwards with reference to FIG. 12.

In channel switching process A, when determination is made that a Ddown confirmation command has not been received (NO at step S451), CPU 13A of analog control unit 13 determines whether an Adown confirmation command has been received from digital control unit 12 (step S471). When determination is made that the command has not been received (NO at step S471), CPU 13A of analog control unit 13 returns control to the main process from which this channel switching process A was invoked.

When determination is made that the command has been received (YES at step S471), CPU 13A of analog control unit 13 executes Adown process A (step S480). Then, CPU 13A of analog control unit 13 returns control to the main process from which this channel switching process A was invoked. Adown process A will be described hereinafter with reference to FIG. 12.

Referring to FIG. 12, the Adown process includes an Adown process D corresponding to the flow chart at the left side of FIG. 12, executed by CPU 12A of digital control unit 12, and an Adown process A corresponding to the flow chart at the right side of FIG. 12, executed by CPU 13A of analog control unit 13.

At Adown process A, CPU 13A of analog control unit 13 transmits physical channel number "N" of the currently received channel to digital control unit 12 (step S481).

At Adown process D, CPU 12A of digital control unit 12 causes transition of digital demodulator 18 and MPEG decoder 22 to a normal mode from a power saving mode (step S381).

CPU 12A of digital control unit 12 determines whether physical channel number "N" has been received from analog control unit 13 (step S382). When determination is made that physical channel number "N" has not been received (NO at step S382), CPU 12A of digital control unit 12 repeats step S382.

When determination is made that physical channel number "N" has been received (YES at step S382), CPU 12A of digital control unit 12 reads out channel number "M-m" of the channel next to the received physical channel number "N" in the descending order direction from the digital channel map stored in memory 12B, and transmits that channel number "M-m" to analog control unit 13 (step S383). Then, CPU 12A of digital control unit 12 proceeds to step S384.

At Adown process A, CPU 13A of analog control unit 13 determines whether channel number "M-m" has been received from digital control unit 12 (step S482). When determination is made that channel number "M-m" has not been received (NO at step S482), CPU 13A of analog control unit 13 repeats step S482.

When determination is made that channel number "M-m" has been received (YES at step S482), CPU 13A of analog control unit 13 reads out the next channel number "L" of channel number "N" in the descending order direction from the analog channel map stored in memory 13B, and compares that channel number "L" with physical channel number "M" of the received channel number "M-m" (step S483). Then, CPU 13A of analog control unit 13 determines whether M<L is established or not (step S484).

When determination is made that M<L is established (YES at step S484), CPU 13A of analog control unit 13 transmits an analog channel switching instruction command that instructs channel switching to channel number "L" to digital control unit 12 (step S485). Then, CPU 13A of analog control unit 13 returns control to the main process from which this Adown process A was invoked.

When determination is made that M<L is not established (NO at step S484), CPU 13A of analog control unit 13 transmits a digital channel switching instruction command that instructs channel switching to channel number "M-m" to digital control unit 12 (step S486).

CPU 13A of analog control unit 13 causes transition of analog demodulator 20 to a power saving mode from a normal mode (step S487). Then, CPU 13A of analog control unit 13 returns control to the main process from which this Adown process A was invoked.

At Adown process D, CPU 12A of digital control unit 12 determines whether an analog channel switching instruction command to channel number "L" has been received from analog control unit 13 (step S384). When determination is made that an analog channel switching instruction command has not been received (NO at step S384), CPU 12A of a digital control unit 12 determines whether a digital channel switching instruction command to channel number "M-m" has been received or not (step S487). When determination is made that a digital channel switching instruction command has not been received (NO at step S487), CPU 12A of digital control unit 12 returns to the process of step S384.

When determination is made that an analog channel switching instruction command has been received (YES at step S384), CPU 12A of digital control unit 12 outputs a channel switching signal that instructs channel switching to an analog channel of channel number "L" to tuner 16A (step S385).

CPU 12A of digital control unit 12 causes transition of digital demodulator 18 and MPEG decoder 22 to a power saving mode from a normal mode (step S386). Then, CPU 12A of digital control unit 12 returns control to the main process from which this Adown process D was invoked.

When determination is made that a digital channel switching instruction command has been received (YES at step S387), CPU 12A of digital control unit 12 outputs a channel switching signal that instructs channel switching to a digital channel of channel number "M-m" to tuner 16A (step S388). Then, CPU 12A of digital control unit 12 returns control to the main process from which this Adown process D was invoked.

When a channel down signal is received during reception of an analog channel, Adown process D and Adown process A are executed. In the case where the next channel in the descending order direction is an analog channel, control is effected to switch to that analog channel. Analog control unit 13 continues control of broadcast signal reception, and digital demodulator 18 and MPEG decoder 22 enter a power saving mode. In the case where the next channel in the descending order direction is a digital channel, control is effected to switch to that digital channel. Control of broadcast signal reception is transferred to digital control unit 12, and analog demodulator 20 enters a power saving mode.

Thus, in the case where a digital channel is being received (that is, a digital broadcast signal is currently extracted by channel 16A) when an instruction of the channel switching direction is accepted by broadcast receiver device 1A of the second embodiment, determination is made as to which of a channel number (analog number) of the channel next to the currently received channel in the switching direction according to the order indicated in the analog channel map and a channel number (digital number) of the channel next to the currently received channel in the switching direction according to the order indicated in the digital channel map is closer to the currently received channel number. When determination is made of being closer to the analog number, switching is effected to the channel of the analog number. When determination is made of being closer to the digital number, switching is effected to the channel of the digital number.

In the case where an analog channel is being received (that is, an analog broadcast signal is currently extracted by tuner 16A) when an instruction of the switching direction is accepted, determination is made as to which of the digital number and analog number is closer to the currently received number. When determination is made of being closer to the digital number, switching is effected to the channel of the digital number. When determination is made of being closer to the analog number, switching is effected to the channel of the analog number.

Thus, switching is effected to a digital channel or an analog channel whose number is closer to the number of the currently received channel, regardless of which of a digital broadcast signal or an analog broadcast signal is currently being extracted. As a result, switching between an analog channel and a digital channel can be effected in a seamless manner.

Also in broadcast receiver device 1A, digital control unit 12 inquiries of analog control unit 13 about the analog number. Analog control unit 13 transmits the inquired analog number to digital control unit 12. Digital control unit 12 determines which of the analog number transmitted from analog control unit 13 and the digital number is closer to the currently received number.

In a similar manner, analog control unit 13 inquires of digital control unit 12 about the digital number. Digital control unit 12 transmits the inquired digital number to analog control unit 13. Analog control unit 13 determines which of the digital number transmitted from digital control unit 12 and the analog number is closer to the currently received number.

Therefore, digital control unit 12 and analog control unit 13 cooperate with each other to switch between an analog channel and a digital channel in a seamless manner even in the case where digital control unit 12 and analog control unit 13 are separated physically.

In a digital broadcast signal reception mode at broadcast receiver device 1A, digital demodulator 18 and MPEG decoder 22 (digital broadcast reception block) enter a power saving state when switched to an analog channel whereas analog demodulator 20 (analog broadcast reception block) enters a power saving mode when switched to a digital channel. In an analog broadcast signal reception mode at broadcast receiver device 1A, the analog broadcast reception block enters a power saving mode when switched to a digital channel whereas the digital broadcast reception block enters a power saving mode when switched to an analog channel.

By broadcast receiver device 1A, transition of either analog broadcast reception block or digital broadcast reception block, whichever is not used, to a power saving mode is effected. As a result, power can be saved at either the analog broadcast reception block or digital broadcast reception block that is not currently used.

The second embodiment was described in which the signal from remote control receiving unit 26A is applied to digital control unit 12, and tuner 16A is under control of digital control unit 12. The present invention is not limited thereto, and a signal from remote control receiving unit 26A may be applied to analog control unit 13, and tuner 16A be under control of analog control unit 13.

The second embodiment was described in which the signal from remote control receiving unit 26A is applied to digital control unit 12, and tuner 16A is under control of digital control unit 12. However, when a channel up signal is received from remote control receiving unit 26 by digital control unit 12 at step S311, for example, transmission of the command at step S313 and step S331 causes input of the indication of the channel up signal being received to analog control unit 13. Also, when a channel down signal is received from remote control receiving unit 26 by digital control unit 12 at step S351, for example, transmission of the command at step S353 and step S371 causes input of the indication of the channel down signal being received to analog control unit 13. Reflecting execution of step S445, step S446, step S485 and step S486 by analog control unit 13, tuner 16A is controlled at step S345, step S348, step S385, and step S388.

Thus in the second embodiment, the signal from remote control receiving unit 26 is substantially also input to analog control unit 13, and tuner 16A is controlled also by analog control unit 13. Thus, input of an instruction of the channel switching direction and control of tuner 16A are not limited to those carried out directly, and may be carried out indirectly.

The first and second embodiments are based on a structure of broadcast receiver device 1/1A. A broadcast receiving set including broadcast receiver device 1/1A, and a monitor 40 providing video and audio signals from broadcast receiver device 1/1A may also be implemented in accordance with the present invention.

Further, a broadcast recorder device including broadcast receiver device 1/1A and a recorder that records video and audio signals from broadcast receiver device 1/1A may be implemented.

Further additionally, a broadcast receiver and recorder device including broadcast receiver device 1/1A, a recorder that records video signal and audio signal from broadcast receiver device 1/1A, and a monitor 40 providing video and audio signals from broadcast receiver device 1/1A or monitor 40 may be implemented.

The first embodiment was described in which digital control unit 10 or analog control unit 11, whichever corresponds to the broadcast signal receiving side, determines whether a channel switching direction instruction has been received or not to notify the other control unit of receiving a switching direction instruction.

The present invention is not limited to thereto, and may be configured in which the control unit corresponding to the broadcast signal receiving side and the control unit not corresponding to the broadcast signal receiving side both determine whether a channel switching direction instruction has been received or not.

For example, both digital control unit 10 and analog control unit 11 may determine whether a channel up signal has been input as in step S111 and determine whether a digital channel is currently being received as in step S112 to have Dup process D and Dup process A executed when a channel up signal is input and a digital channel is being received.

The first and second embodiments have been described based on the invention of broadcast receiver device 1/1A. However, the present invention is not limited thereto, and encompasses a channel switching method of executing the process from FIG. 2 to FIG. 6 or from FIG. 8 to FIG. 12 by broadcast receiver device 1/1A.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A broadcast receiver device comprising:
a tuner switching a channel and extracting a broadcast signal corresponding to the switched channel from externally applied broadcast signals corresponding to respective plurality of channels,
a digital broadcast reception block converting a digital broadcast signal extracted by said tuner into an output signal to output the converted output signal,
an analog broadcast reception block converting an analog broadcast signal extracted by said tuner into an output signal to output the converted output signal,
a digital control unit controlling said digital broadcast reception block,
an analog control unit controlling said analog broadcast reception block,
digital storage means provided at said digital control unit for prestoring a digital channel map in which each channel of a digital broadcast is arranged in order of a preassigned number,
analog storage means provided at said analog control unit for prestoring an analog channel map in which each channel of an analog broadcast is arranged in order of a preassigned number,
switching instruction acceptance means for accepting an instruction of a switching direction of said channel,
analog inquiry means provided at said digital control unit for inquiring of said analog control unit about an analog number that is the number of the channel next to a currently extracted channel in said switching direction according to the order indicated in the analog channel map stored in said analog storage means in a case where a digital broadcast signal is currently extracted by said tuner when said instruction of the switching direction is accepted by said switching instruction acceptance means,
analog transmission means provided at said analog control unit for transmitting the analog number inquired by the analog inquiry means to said digital control unit,
digital determination means provided at said digital control unit for determining which of the analog number transmitted by said analog transmission means and a digital number that is the number of the channel next to the currently extracted channel in said switching direction according to the order indicated in the digital channel map stored in said digital storage means is closer to a currently extracted number that is the number of the currently extracted channel,
digital extraction mode analog switching control means provided at said analog control unit for controlling said tuner to switch to the channel of said analog number when determination is made of being closer to said analog number by said digital determination means,
digital extraction mode digital power saving means for causing transition of said digital broadcast reception block to a power saving state when switched to the channel of said analog number by said digital extraction mode analog switching control means,
digital extraction mode digital switching control means provided at said digital control means for controlling said tuner to switch to the channel of said digital number when determination is made of being closer to said digital number by said digital determination means,
digital extraction mode analog power saving means for causing transition of said analog broadcast reception block to a power saving state when switched to the channel of said digital number by said digital extraction mode digital switching control means,
digital inquiry means provided at said analog control means for inquiring of said digital control unit about said digital number in a case where an analog broadcast signal is currently extracted by said tuner when said instruction of the switching direction is accepted by said switching instruction acceptance means,
digital transmission means provided at said digital control unit for transmitting the digital number inquired by said digital inquiry means to said analog control unit,
analog determination means provided at said analog control unit for determining which of the digital number transmitted by said digital transmission means and said analog number is closer to said currently extracted number,
analog extraction mode digital switching control means provided at said digital control unit for controlling said tuner to switch to the channel of said digital number when determination is made of being closer to said digital number by said analog determination means,
analog extraction mode analog power saving means for causing transition of said analog broadcast reception block to a power saving state when switched to the channel of said digital number by said analog extraction mode digital switching control means,
analog extraction mode analog switching control means provided at said analog control unit for controlling said tuner to switch to the channel of said analog number when determination is made of being closer to said analog number by said analog determination means, and analog extraction mode digital power saving means for causing transition of said digital broadcast reception block to a power saving state when switched to the channel of said analog number by said analog extraction mode analog switching control means.

2. A broadcast receiver device comprising:

a broadcast signal extraction unit switching a channel and extracting a broadcast signal corresponding to the switched channel from externally applied broadcast signals corresponding to respective plurality of channels, a digital signal conversion unit converting a digital broadcast signal extracted by said broadcast signal extraction unit into an output signal to output the converted output signal, an analog signal conversion unit converting an analog broadcast signal extracted by said broadcast signal extraction unit into an output signal to output the converted output signal, a digital control unit controlling said digital signal conversion unit, an analog control unit controlling said analog signal conversion unit, digital storage means provided at said digital control unit for prestoring a digital channel map in which each channel of a broadcast signal is arranged in order of a preassigned number, analog storage means provided at said analog control unit for prestoring an analog channel map in which each channel of an analog broadcast is arranged in order of a preassigned number, switching instruction acceptance means for accepting an instruction of a switching direction of said channel, digital determination means provided at said digital control unit for determining which of an analog number that is the number of the channel next to a currently extracted channel in said switching direction according to the order indicated in the analog channel map stored in said analog storage means and a digital number that is the number of the channel next to the currently extracted channel in said switching direction according to the order indicated in the digital channel map stored in said digital storage means is closer to a currently extracted number that is the number of the currently extracted channel, in a case where a digital broadcast signal is currently extracted by said broadcast signal extraction unit when said instruction of the switching direction is accepted by said switching instruction acceptance means, digital extraction mode analog switching control means provided at said analog control unit for controlling said broadcast signal extraction unit to switch to the channel of said analog number when determination is made of being closer to said analog number by said digital determination means, digital extraction mode digital switching control means provided at said digital control unit for controlling said broadcast signal extraction unit to switch to the channel of said digital number when determination is made of being closer to said digital number by said digital determination means, analog determination means provided at said analog control unit for determining which of said digital number and said analog number is closer to said currently extracted number in a case where an analog broadcast signal is currently extracted by said broadcast signal extraction unit when said instruction of the switching direction is accepted by said switching instruction acceptance means, analog extraction mode digital switching control means provided at said digital control unit for controlling said broadcast signal extraction unit to switch to the channel of said digital number when determination is made of being closer to said digital number by said analog determination means, and analog extraction mode analog switching control means provided at said analog control unit for controlling said broadcast signal extraction unit to switch to the channel of said analog number when determination is made of being closer to said analog number by said analog determination means.

3. The broadcast receiver device according to claim 2, wherein said digital determination means comprises analog inquiry means for inquiring of said analog control unit about said analog number, said analog determination means comprises digital inquiry means for inquiring of said digital control unit about said digital number, said broadcast receiver device further comprising:

analog transmission means provided at said analog control unit for transmitting the analog number inquired by said analog inquiry means to said digital control unit, digital transmission means provided at said digital control unit for transmitting the digital number inquired by said digital inquiry means to said analog control unit, wherein said digital determination means determines which of the analog number transmitted by said analog transmission means and said digital number is closer to the currently extracted number, and said analog determination means determines which of the digital number transmitted by said digital transmission means and said analog number is closer to the currently extracted number.

4. The broadcast receiver device according to claim 3, further comprising:

digital extraction mode digital power saving means for causing transition of said digital signal conversion unit to a power saving state when switched to the channel of said analog number by said digital extraction mode analog switching control means, digital extraction mode analog power saving means for causing transition of said analog signal conversion unit to a power saving state when switched to the channel of said digital number by said digital extraction mode digital switching control means, analog extraction mode analog power saving means for causing transition of said analog signal conversion unit to a power saving state when switched to the channel of said digital number by said analog extraction mode digital switching control means, and analog extraction mode digital power saving means for causing transition of said digital signal conversion unit to a power saving state when switched to the channel of said analog number by said analog extraction mode analog switching control means.

5. The broadcast receiver device according to claim 4, wherein said broadcast signal extraction unit is a tuner, said digital signal conversion unit is a digital broadcast reception block, and said analog signal conversion unit is an analog broadcast reception block.

6. A broadcast receiving set comprising the broadcast receiver device defined in claim 2, and an output device providing information indicated by an output signal output from one of said digital signal conversion unit and said an analog signal conversion unit.

7. A channel switching method for switching a channel by a broadcast receiver device including a broadcast signal extraction unit switching a channel and extracting a broadcast signal corresponding to the switched channel from externally applied broadcast signals corresponding to respective plurality of channels, a digital signal conversion unit converting a digital broadcast signal extracted by said broadcast signal extraction unit into an output signal to output the converted output signal, an analog signal conversion unit converting an analog broadcast signal extracted by said broadcast signal extraction unit into an output signal to output the converted output signal, a digital control unit controlling said digital signal conversion unit, and an analog control unit controlling said analog signal conversion unit, said digital control unit prestoring a digital channel map in which each channel of a digital broadcast is arranged in order of a preassigned number, said analog control unit prestoring an analog channel map in which each channel of an analog broadcast is arranged in order of a preassigned number, said channel extraction method comprising the steps of:

accepting an instruction of a switching direction of said channel, said digital control unit determining which of an analog number that is the number of the channel next to a currently extracted channel in said switching direction according to the order indicated in said analog channel map and a digital number that is the number of the channel next to the currently extracted channel in said switching direction according to the order indicated in said digital channel map is closer to a currently extracted number that is the number of the currently extracted channel in a case where a digital broadcast signal is currently extracted by said broadcast signal extraction unit when said instruction of the switching direction is accepted, said analog control unit controlling said broadcast signal extraction unit to switch to the channel of said analog number when determination is made of being closer to said analog number, said digital control unit controlling said broadcast signal extraction unit to switch to the channel of said digital number when determination is made of being closer to said digital number, said analog control unit determining which of said digital number and said analog number is closer to said currently extracted number in a case where an analog broadcast signal is currently extracted by said broadcast signal extraction unit when said instruction of the switching direction is accepted, said digital control unit controlling said broadcast signal extraction unit to switch to the channel of said digital number when determination is made of being closer to the digital number, and said analog control unit controlling said broadcast signal extraction unit to switch to the channel of said analog number when determination is made of being closer to said analog number.

* * * * *